US007957418B2

(12) United States Patent
Wijayanathan et al.

(10) Patent No.: US 7,957,418 B2
(45) Date of Patent: Jun. 7, 2011

(54) DATA BURST COMMUNICATION TECHNIQUES FOR USE IN INCREASING DATA THROUGHPUT TO MOBILE COMMUNICATION DEVICES

(75) Inventors: Maiyuran Wijayanathan, Waterloo (CA); Noushad Naqvi, Waterloo (CA); Hugh Hind, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 865 days.

(21) Appl. No.: 11/831,200

(22) Filed: Jul. 31, 2007

(65) Prior Publication Data

US 2009/0034506 A1 Feb. 5, 2009

(51) Int. Cl.
*H04J 3/22* (2006.01)
(52) U.S. Cl. ........................................ 370/468; 370/458
(58) Field of Classification Search .................. 370/336, 370/345, 347; 455/550.1
See application file for complete search history.

(56) References Cited

U.S. PATENT DOCUMENTS

| | | | |
|---|---|---|---|
| 5,533,094 | A | 7/1996 | Sanmugam |
| 5,809,015 | A | 9/1998 | Elliott et al. |
| 6,091,960 | A | 7/2000 | Raith et al. |
| 6,094,426 | A | 7/2000 | Honkasalo et al. |
| 6,349,094 | B1 | 2/2002 | Vastano et al. |
| 6,665,307 | B1 | 12/2003 | Rydnell et al. |
| 6,795,413 | B1 | 9/2004 | Uhlik et al. |
| 6,987,778 | B2 | 1/2006 | Sindhushayana et al. |

(Continued)

FOREIGN PATENT DOCUMENTS

DE 19707261 C1 4/1998

(Continued)

OTHER PUBLICATIONS

3rd Generation Partnership Project:; Technical Specification Group GSM/EDGE; Radio Access Network; Multiplexing and Mutiple Acess on the Radio Path (release 6), 3GPP TS 45.002 V6.12.0, Nov. 2005, Sec. 5.1-5.2.3 (p. 17-19), total 4 pages (including cover page).*

(Continued)

*Primary Examiner* — Albert T Chou
(74) *Attorney, Agent, or Firm* — John J. Oskorep, Esq.

(57) ABSTRACT

Methods and apparatus for use in increasing data throughput to mobile stations in a wireless communication network, where data is communicated between mobile stations and the wireless network in a plurality of data bursts within time slots assigned to the mobile station. One illustrative method includes the acts of receiving, through a wireless transceiver, data in a time slot W; tuning the wireless transceiver, during a first portion of a time slot X which follows the time slot W, for transmission; reading transmit data from a transmit data queue and encoding the transmit data in a data burst in accordance with a data burst format; and causing the encoded transmit data to be transmitted in the data burst during a second portion of the time slot X. The data burst may be formatted in accordance with a predefined data burst format of the wireless network and merely shifted in time, or the data burst may be formatted in accordance with a reduced-size data burst format. When such alternate data burst technique is utilized, extra available time remains to tune the wireless transceiver from receive to transmit mode, or transmit to receive mode. Thus, an additional downlink time slot(s) per data frame may be allocated to the mobile station for increased data throughput, where at least one uplink time slot per data frame is utilized for data transmission.

42 Claims, 10 Drawing Sheets

U.S. PATENT DOCUMENTS

| | | |
|---|---|---|
| 7,058,400 B2 | 6/2006 | Brooks |
| 7,145,896 B1 | 12/2006 | Sebire |
| 2004/0151143 A1* | 8/2004 | Abdesselem et al. ......... 370/336 |
| 2005/0009523 A1 | 1/2005 | Pekonen |
| 2007/0101210 A1 | 5/2007 | Huang |
| 2007/0195740 A1 | 8/2007 | Bhushan et al. |
| 2007/0253364 A1 | 11/2007 | Wandel |
| 2009/0161746 A1 | 6/2009 | Mirbagheri et al. |

FOREIGN PATENT DOCUMENTS

| | | |
|---|---|---|
| EP | 1059740 A1 | 12/2000 |
| EP | 1261227 A1 | 11/2002 |
| EP | 1489875 A1 | 12/2004 |
| GB | 2419498 A | 4/2006 |
| WO | 2005057800 A2 | 6/2005 |
| WO | 2008027294 A2 | 3/2008 |

OTHER PUBLICATIONS

3rd Generation Partnership Project:; Technical Specification Group Core Network; Mobile Radio Interface Layer 3 Specification; Core Network Protocols; Stage 3 (release 4), 3GPP TS 24.008 V4.14.0, Jun. 2004, Sec. 10.5.5.12-10,5.5.12a (p. 381-389), total 10 pages (including cover page).*

International Search Report and Written Opinion—PCT Application No. PCT/CA2008/001408—Nov. 18, 2008.

Extended European Search Report for EPO patent application 07113521.4, Mar. 7, 2008.

International Preliminary Report On Patentability and Written Opinion for PCT application # PCT/CA2008/001408, Filed Jul. 31, 2008.

* cited by examiner

DATA BURST COMMUNICATION TECHNIQUES FOR USE IN INCREASING DATA THROUGHPUT TO MOBILE COMMUNICATION DEVICES

BACKGROUND

1. Field of the Technology

The present disclosure relates generally to data burst communication techniques for mobile communication devices which operate in wireless communication networks.

2. Description of the Related Art

A mobile communication device (e.g. a mobile station or MS) may operate in a wireless communication network which provides for high-speed data communications. For example, the mobile station may operate in accordance with Global System for Mobile Communications (GSM) and General Packet Radio Service (GPRS) technologies. Today, such a mobile station may further operate in accordance with Enhanced Data rates for GSM Evolution (EDGE) or Enhanced GPRS (EGPRS).

EDGE/EGPRS is digital mobile telephone technology that allows for increased data transmission rate and improved data transmission reliability. It is generally classified as a 2.75G network technology. EDGE has been introduced into GSM networks around the world since 2003, initially in North America. EDGE/EGPRS may be used in any packet-switched application, such as those involving an Internet connection. High-speed data applications, such as video and other multimedia services, benefit from EGPRS' increased data capacity.

A mobile station operative in accordance with EGPRS may have multi-slot capability which enables them to use between one (1) and eight (8) time slots for data transfer (see e.g. 3GPP specification). Since uplink, and downlink channels are reserved separately, various multi-slot resource configurations may be allocated in different directions. Mobile stations are categorized into two types based on the multi-slot class that it supports: (1) Multi-slot Classes 1-12, 30-45 (Type 1). These classes have multi-slot capability in the uplink (UL) and downlink (DL) directions and may use this capability (quasi) simultaneously. This group of multi-slot classes may use half duplex or full duplex communication. (2) Multi-slot Class 19-29 (Type 1). This class is less sophisticated than the previous group and, in the current GPRS phase, will use only half-duplex operation. The reason for this limitation may be explained by selecting, for example, multi-slot class 26. In this case, the maximum allowable timeslot in the UL is 4 and in the DL it is 8. Simultaneous transmission and reception of such a magnitude is possible only if the mobile station is capable of transmitting and receiving at the same time. This particular group, however, does not have such capability and the specification limits their operation to half-duplex. (3) Multi-slot Class 13-18 (Type 2). This class is the most advanced group of mobile stations. They have capability to simultaneously transmit and receive (full duplex communication), requiring splitters, duplexers and filters to separate transmit and receive paths.

Table 1 below describes the permitted multi-slot classes within 3 GPP Rel. 6 specification. Again, multi-slot Class 13-18 (Type 2) is the most advanced group of mobile stations and such class is highlighted in Table 1. As illustrated, although the number of allocated receive (Rx) and transmit (Tx) time slots may change dynamically for the mobile station, the total number of Rx+Tx slots within a given frame never exceeds the value "Sum" provided in the Table 1.

TABLE 1

Multi-slot Classes

| Multi-slot class | Maximum Number of Slots | | | Minimum Number of Slots | | | | Type |
|---|---|---|---|---|---|---|---|---|
| | Rx | Tx | Sum | $T_{ta}$ | $T_{tb}$ | $T_{ra}$ | $T_{rb}$ | |
| 1  | 1 | 1 | 2 | 3 | 2 | 4 | 2 | 1 |
| 2  | 2 | 1 | 3 | 3 | 2 | 3 | 1 | 1 |
| 3  | 2 | 2 | 3 | 3 | 2 | 3 | 1 | 1 |
| 4  | 3 | 1 | 4 | 3 | 1 | 3 | 1 | 1 |
| 5  | 2 | 2 | 4 | 3 | 1 | 3 | 1 | 1 |
| 6  | 3 | 2 | 4 | 3 | 1 | 3 | 1 | 1 |
| 7  | 3 | 3 | 4 | 3 | 1 | 3 | 1 | 1 |
| 8  | 4 | 1 | 5 | 3 | 1 | 2 | 1 | 1 |
| 9  | 3 | 2 | 5 | 3 | 1 | 2 | 1 | 1 |
| 10 | 4 | 2 | 5 | 3 | 1 | 2 | 1 | 1 |
| 11 | 4 | 3 | 5 | 3 | 1 | 2 | 1 | 1 |
| 12 | 4 | 4 | 5 | 2 | 1 | 2 | 1 | 1 |
| 13 | 3 | 3 | N/A | N/A | (a) | 3 | (a) | 2 |
| 14 | 4 | 4 | N/A | N/A | (a) | 3 | (a) | 2 |
| 15 | 5 | 5 | N/A | N/A | (a) | 3 | (a) | 2 |
| 16 | 6 | 6 | N/A | N/A | (a) | 2 | (a) | 2 |
| 17 | 7 | 7 | N/A | N/A | (a) | 1 | 0 | 2 |
| 18 | 8 | 8 | N/A | N/A | 0 | 0 | 0 | 2 |
| 19 | 6 | 2 | NA | 3 | (b) | 2 | (c) | 1 |
| 20 | 6 | 3 | NA | 3 | (b) | 2 | (c) | 1 |
| 21 | 6 | 4 | NA | 3 | (b) | 2 | (c) | 1 |
| 22 | 6 | 4 | NA | 2 | (b) | 2 | (c) | 1 |
| 23 | 6 | 6 | NA | 2 | (b) | 2 | (c) | 1 |
| 24 | 8 | 2 | NA | 3 | (b) | 2 | (c) | 1 |
| 25 | 8 | 3 | NA | 3 | (b) | 2 | (c) | 1 |
| 26 | 8 | 4 | NA | 3 | (b) | 2 | (c) | 1 |
| 27 | 8 | 4 | NA | 2 | (b) | 2 | (c) | 1 |
| 28 | 8 | 6 | NA | 2 | (b) | 2 | (c) | 1 |
| 29 | 8 | 8 | NA | 2 | (b) | 2 | (c) | 1 |
| 30 | 5 | 1 | 6 | 2 | 1 | 1 | 1 | 1 |
| 31 | 5 | 2 | 6 | 2 | 1 | 1 | 1 | 1 |
| 32 | 5 | 3 | 6 | 2 | 1 | 1 | 1 | 1 |
| 33 | 5 | 4 | 6 | 2 | 1 | 1 | 1 | 1 |
| 34 | 5 | 5 | 6 | 2 | 1 | 1 | 1 | 1 |
| 35 | 5 | 1 | 6 | 2 | 1 | 1 + to | 1 | 1 |
| 36 | 5 | 2 | 6 | 2 | 1 | 1 + to | 1 | 1 |
| 37 | 5 | 3 | 6 | 2 | 1 | 1 + to | 1 | 1 |
| 38 | 5 | 4 | 6 | 2 | 1 | 1 + to | 1 | 1 |
| 39 | 5 | 5 | 6 | 2 | 1 | 1 + to | 1 | 1 |
| 40 | 6 | 1 | 7 | 1 | 1 | 1 | to | 1 |
| 41 | 6 | 2 | 7 | 1 | 1 | 1 | to | 1 |
| 42 | 6 | 3 | 7 | 1 | 1 | 1 | to | 1 |
| 43 | 6 | 4 | 7 | 1 | 1 | 1 | to | 1 |
| 44 | 6 | 5 | 7 | 1 | 1 | 1 | to | 1 |
| 45 | 6 | 6 | 7 | 1 | 1 | 1 | to | 1 | where
(a) = 1 with frequency hopping = 0 without frequency hopping
(b) = 1 with frequency hopping or change from Rx to Tx (i.e. MS Type 1) = 0 without frequency hopping and no change from Rx to Tx. (i.e. MS Type 2)
(c) = 1 with frequency hopping or change from Tx to Rx (i.e. MS Type 1) = 0 without frequency hopping and no change from Tx to Rx (i.e. MS Type 2)
to = 31 symbol periods (this can be provided by a TA offset. i e., a minimum TA value
NA = Not Applicable Parameters shown in Table 1 are defined as follows:

$T_{ta}$: $T_{ta}$ relates to the time needed for the MS to perform adjacent cell signal level measurement and get ready to transmit. For type 1 MS, it is the minimum number of timeslots that will be allowed between the end of the previous transmit, or receive time slot and the next transmit time slot when measurement is to be performed between, ft should be noted that, in practice, the minimum time allowed may be reduced by amount of timing advance. For type 1 MS that supports extended TA, the parameter $T_{tn}$ is increased by 1 if TA>63 and there is a change from Rx to Tx. For type 2 MS, it is not applicable.

$T_{tb}$: $T_{tb}$, relates to the time needed for the MS to get ready to transmit. This minimum requirement will only be used when adjacent cell power measurements are not required by the service selected. For type 1 MS, it is the minimum number of timeslots that will be allowed between the end of the previous receive time slot and the next transmit time slot or between the previous transmit time slot and the next transmit time slot when the frequency is changed in between. It should be noted that, in practice, the minimum time allowed may be reduced by the amount of the timing advance. For type 1 MS that supports extended TA, the parameter $T_{tb}=2$ if TA>63 and there is a change from Rx to Tx. For type 2 MS, it is the minimum number of timeslots that will be allowed between the end of the last transmit burst in a TDMA frame and the first transmit burst in the next TDMA frame.

$T_{ra}$: $T_{ra}$ relates to the time needed for the MS to perform adjacent cell signal level measurement and get ready to receive. For type 1 MS it is the minimum number of timeslots that will be allowed between the previous transmit or receive time slot and the next receive time slot when measurement is to be performed between. For type 2 MS, it is the minimum number of timeslots that will be allowed between the end of the last receive burst in a TDMA frame and the first receive burst in the next TDMA frame.

$T_{rb}$: $T_{rb}$ relates to the time needed for the MS to get ready to receive. This minimum requirement will only be used when adjacent cell power measurements are not required by the service selected For type 1. MS, it is the minimum number of timeslots that will be allowed between the previous transmit time slot and the next receive time slot or between the previous receive time slot and the next receive time slot when the frequency is changed in between. For type 2 MS, it is the minimum number of timeslots that will be allowed between the end of the last receive burst in a TDMA frame and the first receive burst in the next TDMA frame.

Note that the coding of the timing advance (TA) value (8 bits) is the representation of the timing advance in bit periods; 1 bit period=$48/13$ μs. Also, for all the bands except GSM 400, the values 0-63 are valid TA values, and bit 7 and bit 8 are set to spare. For GSM 400, the values 0 to 219 are valid TA values. The remaining values 220 to 255 decimal are reserved.

As apparent, mobile stations may be assigned to or allocated downlink time slots in a variable manner. Preferably, mobile stations may be assigned or allocated a relatively large number of downlink time slots for increased data throughput to the mobile stations.

Referring ahead to FIGS. 4 and 5, what are shown are timing diagrams 400 and 500 for use in illustrating problems associated with assigning or allocating a mobile station a relatively large number of downlink time slots for increased data throughput. Timing diagram 400 of FIG. 4 reveals the structure of a plurality of downlink time slots 402 (top row) and a plurality of uplink time slots 404 (bottom row) of a wireless communication system. Data are communicated between a plurality of mobile stations and a base station of a wireless communication network in a plurality of data bursts contained within downlink and uplink time slots 402 and 404 assigned to each mobile station. Downlink time slots 402 are designated as 0 through 7 in the figure, for a total of eight (8) possible downlink time slots 402 per data frame in the wireless communication system. Also as shown, uplink time slots 404 are designated as 0 through 7 in the figure, for a total of eight (8) possible uplink time slots 404 per data frame in the wireless communication system. In this wireless communication system, the boundaries of each downlink time slot 402 are in exact time alignment with the corresponding boundaries of each uplink time slot 404. Shown as being numerically staggered in relation to the uplink time slots, downlink time slots 0, 1, 2, 3, 4, 5, 6, and 7 have and cover the same time period as uplink time slots 5, 6, 7, 0, 1, 2, 3, and 4, respectively.

Again, data throughput to a mobile station may be increased by increasing the number of downlink time slots 402 assigned to the mobile station. In the example of FIG. 4, five (5) downlink time slots 406 are assigned to the mobile station for data reception (i.e. downlink time slots 0, 1, 2, 3, and 4), two (2) time slots 408 and 410 are utilized for transceiver switching (from receive to transmit mode, and from transmit to receive mode) and obtaining signal strength measurements of adjacent base, station cells, and one (1) time slot 414 is assigned to the mobile station for data transmission (i.e. uplink time slot 4) for each data frame. The following data frame in timing diagram 400 also shows a portion of the next five (5) downlink time slots 416 for data reception (i.e. downlink time slot 0, 1, 2, etc.). The time slot assignment scenario in FIG. 4 would increase data throughput to the mobile station. As apparent, however, increasing the number of downlink time slots 402 assigned to the mobile station correspondingly decreases the number of uplink time slots 404 assigned to the mobile station. Note that, for proper data communications, at least one uplink time slot per data frame should be assigned to and utilized by the mobile station for data transmission from the mobile station. Using conventional data burst techniques in the wireless communication system, however, the time it takes to switch the wireless transceiver of the mobile station from receive to transmit mode, and then back from transmit to receive mode, would have to occupy portions of uplink time slot 414 such that data transmission having proper formatting within uplink time slot 414 would be impossible. Therefore, the time slot assignment scenario of FIG. 4 is unrealistic, unless some special techniques are utilized.

Similarly, timing diagram 500 of FIG. 5 reveals the structure of a plurality of downlink time slots 502 (top row) and a plurality of uplink time slots 502 (bottom row) of a wireless communication system. Data are communicated between a plurality of mobile stations and a base station of a wireless communication network in a plurality of data bursts contained within downlink and uplink time slots 502 and 504 assigned to each mobile station. Downlink time slots 502 are designated as 0 through 7 in the figure, for a total of eight (8) possible downlink time slots 502 per data frame in the wireless communication system. Also as shown, uplink time slots 504 are designated as 0 through 7 in the figure, for a total of eight (8) possible uplink time slots 504 per data frame in the wireless communication system. In this wireless communication system, the boundaries of each downlink time slot 502 are in exact time alignment with the corresponding boundaries of each uplink time slot 504. Shown as being numerically staggered in relation to the uplink time slots, downlink time slots 0, 1, 2, 3, 4, 5, 6, and 7 have and cover the same time period as uplink time slots 5, 6, 7, 0, 1, 2, 3, and 4, respectively.

Again, data throughput to a mobile station may be increased by increasing the number of downlink time slots 502 assigned to the mobile station. In the example of FIG. 5, six (6) downlink time slots 506 are assigned to the mobile station for data reception (i.e. downlink time slots 0, 1, 2, 3, 4, and 5), one (1) time slot 508 is utilized for transceiver switching (from receive to transmit mode), and one (1) time slot 514 is assigned to the mobile station for data transmission (i.e. uplink time slot 4) for each data frame. The following data frame in timing diagram 500 also shows a portion of the next six (6) downlink time slots 516 for data reception (i.e. downlink time slot 0, 1, 2, etc.). The time slot assignment scenario in FIG. 5 would increase data throughput to the mobile station. As apparent, however, increasing the number of downlink time slots 502 assigned to the mobile station correspondingly decreases the number of uplink time slots 504 assigned to the mobile station Note that, for proper data communications, at least one uplink, time slot per data frame should be assigned to and utilized by the mobile station for data transmission from the mobile station. Using conventional data burst techniques in the wireless communication system, however, the time it takes to switch the wireless transceiver of the mobile station from transmit to receive mode would have to occupy a portion of uplink time slot 514 such that data transmission having proper formatting within uplink time slot 514 would be impossible. Therefore, the time slot assignment scenario of FIG. 5 is also unrealistic, unless some special techniques are utilized.

Accordingly, what are needed are improved data burst communication techniques which overcome the deficiencies of the prior art, for increased data throughput, to mobile stations.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Figure 1:
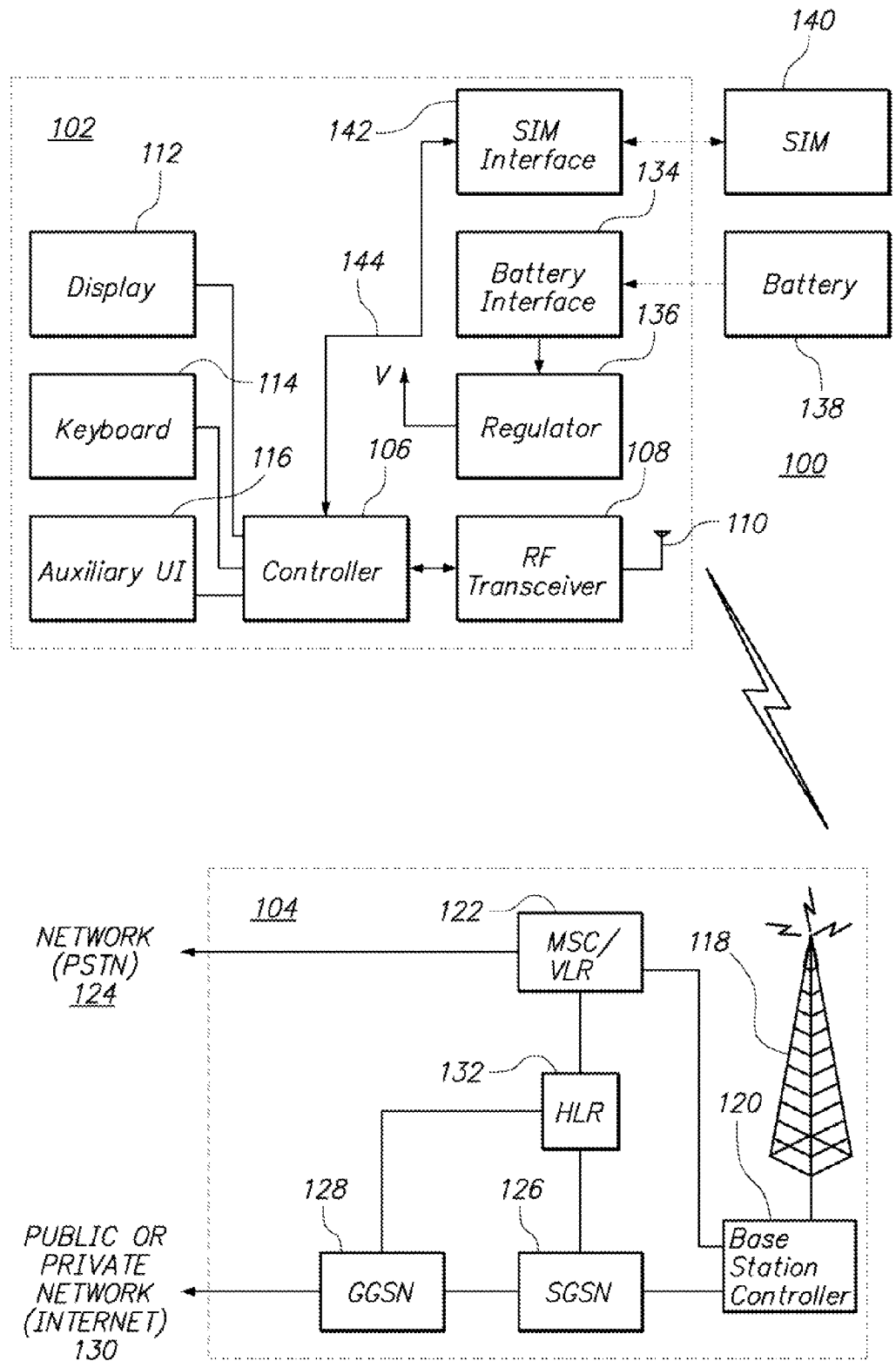
FIG. 1 is a block diagram which illustrates pertinent components of a mobile station and a wireless communication network.

Methods and apparatus for use in increasing data throughput to mobile stations in a wireless communication network, where data is communicated between mobile stations and the wireless network in a plurality of data bursts within time slots assigned to the mobile station, are described herein. One illustrative method includes the acts of receiving, through a wireless transceiver, data in a time slot W; tuning the wireless transceiver, during a first portion of a time slot X which follows the time slot W, for transmission; reading transmit data from a transmit data queue and encoding the transmit data in a data burst in accordance with a data burst format; and causing the encoded transmit data to be transmitted in the data burst during a second portion of the time slot X. In one approach, a predefined data burst format of the wireless communication system has a length corresponding to a time duration of a given time slot in the wireless communication system, and the encoding of the transmit data in the data burst is performed in accordance with the predefined data burst format. In this case, the method includes the additional act of causing the encoded transmit data to be further transmitted in the data burst during a first portion of a time slot Y which follows the time slot X, and then tuning the wireless transceiver during a second portion of the time slot Y for reception. Using this "shifted" data burst transmission technique, extra available time remains to tune the wireless transceiver from receive to transmit mode, and from transmit to receive mode. Thus, additional downlink time slots per data frame may be allocated to the mobile station for increased data throughput, where at least one uplink time slot per data frame is utilized for data transmission.

In one varied approach, the encoding of the transmit data in the data burst is performed in accordance with a reduced-size data burst format having a length (and data payload) that is less than the length (and the data payload) of the predefined data burst format. In this case, additional transmit data may be encoded and transmitted in accordance with the reduced-size data burst format during the first portion of the time slot Y which follows the time slot X, followed by the tuning the wireless transceiver during the second portion of the time slot Y for reception. In another varied approach, the encoding of the transmit data in the data burst is performed in accordance with a reduced (or partial) data burst format which corresponds to a second portion or half of the predefined data burst format. Again, the reduced or partial data burst format defines a length (and data payload) that is less than the length (and the data payload) of the predefined data burst format. In this case, additional transmit data may be encoded and transmitted in accordance with another reduced or partial data burst format, during the first portion of the time slot Y which follows the time slot X. This other reduced or partial data burst format may correspond to a first portion or half of the predefined data burst format. This transmission may be followed by the tuning of the wireless transceiver during the second portion of the time slot Y for reception. Using this "reduced" or "partial" data burst transmission technique, extra available time remains to tune the wireless transceiver from receive to transmit mode, and from transmit to receive mode. Again, additional downlink time slots per data frame may therefore be allocated to the mobile station for increased data throughput, where at least one uplink time slot per data frame is utilized for data transmission.

Another illustrative method of the present disclosure includes the acts of identifying whether one of a first data burst format, and a second data burst format is to be utilized for data communications via a wireless transceiver of the mobile station; reading data from a data queue; if the first data burst format is Identified to be utilized for the data communications: encoding or decoding the data in accordance with the first data burst format having a first length corresponding to a time duration of a given time slot in the wireless communication system, and if the second data burst format is identified to be utilized for the data communications: encoding or decoding the data in accordance with the second data burst format having a second length that is less than the first length. When the second data burst format is utilized, extra available time remains to tune the wireless transceiver from receive to transmit mode, and transmit to receive mode. Additional downlink time slots per data frame may therefore be allocated to the mobile station for increased data throughput to the mobile station, where at least one uplink time slot per data frame can be utilized for data transmission.

To illustrate exemplary system architecture, FIG. 1 shows a block diagram of a communication system 100 which includes a mobile station 102 (one example of a wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile, station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a tower station 118 and a base station controller (BSC) 120 (described later below), including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 includes a battery interface 134 for receiving one or more rechargeable batteries 138. Battery 138 electrical power to electrical circuitry in mobile station 102, and battery interface 134 provides for a mechanical and electrical connection for battery 132. Battery interface 134 is coupled to a regulator 136 which regulates power to the device. Mobile station 102 may be a handheld portable communication device, which includes a housing (e.g. a plastic housing) which carries and contains the electrical components of mobile station 102 including battery 138. Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Preferably, as mentioned earlier, mobile station 102 is a handheld portable communication device which includes a housing (e.g. a plastic housing) which carries and contains the electrical components of mobile station 102. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. Wireless communication network 104 may be a cellular telecommunications network, in the embodiment of FIG. 1, wireless network 104 is configured in accordance with General Packet Radio Service (GPRS) and a Global Systems for Mobile (GSM) technologies. Today, such a mobile station may further operate in accordance with Enhanced Data rates for GSM Evolution (EDGE) or Enhanced GPRS (EGPRS), as described in the Background section. In such environment, wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 12S. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 1.26 is at the same hierarchical level as MSC 122 and keeps track of the individual locations of mobile stations. SGSN 126 also performs security functions and access control. Gateway GPRS Support. Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
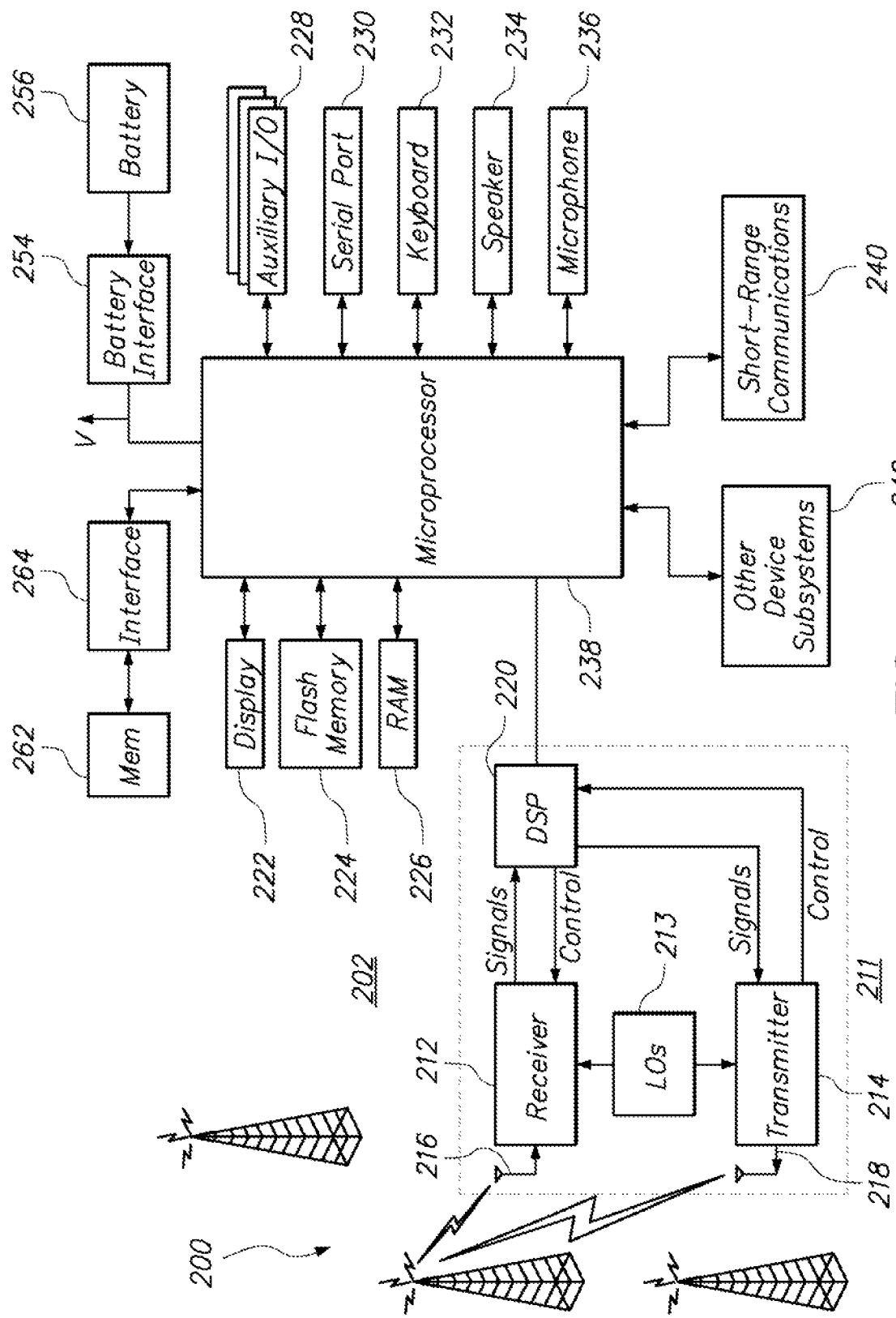
FIG. 2 is a more detailed diagram of a preferred mobile station of FIG. 1.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are Input to transmitter 214 for digital-to-analog (D/A) conversion, frequency up conversion, filtering, amplification and transmission over communication network via antenna 218 DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 (denoted more generally as "mem" in FIG. 2) to be inserted in a SIM interface 264 in order to operate in the network. SIM 262 includes those features described in relation to FIG. 1. Mobile station 202 is a batten-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile, station 202. Communication functions, including at least data and voice communications, are performed through communication subsystem 211. The communication techniques of the present disclosure may generally be controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information. The PIM application preferably has the ability to send and receive data items via the wireless network. In the present disclosure, PIM data items are seamlessly integrated, synchronized, and updated via the wireless network, with the mobile station user's corresponding data items stored and/or associated with a host-computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component which provides for communication between mobile station 202 and different systems or devices, which need not necessarily be similar devices.

Figure 3:
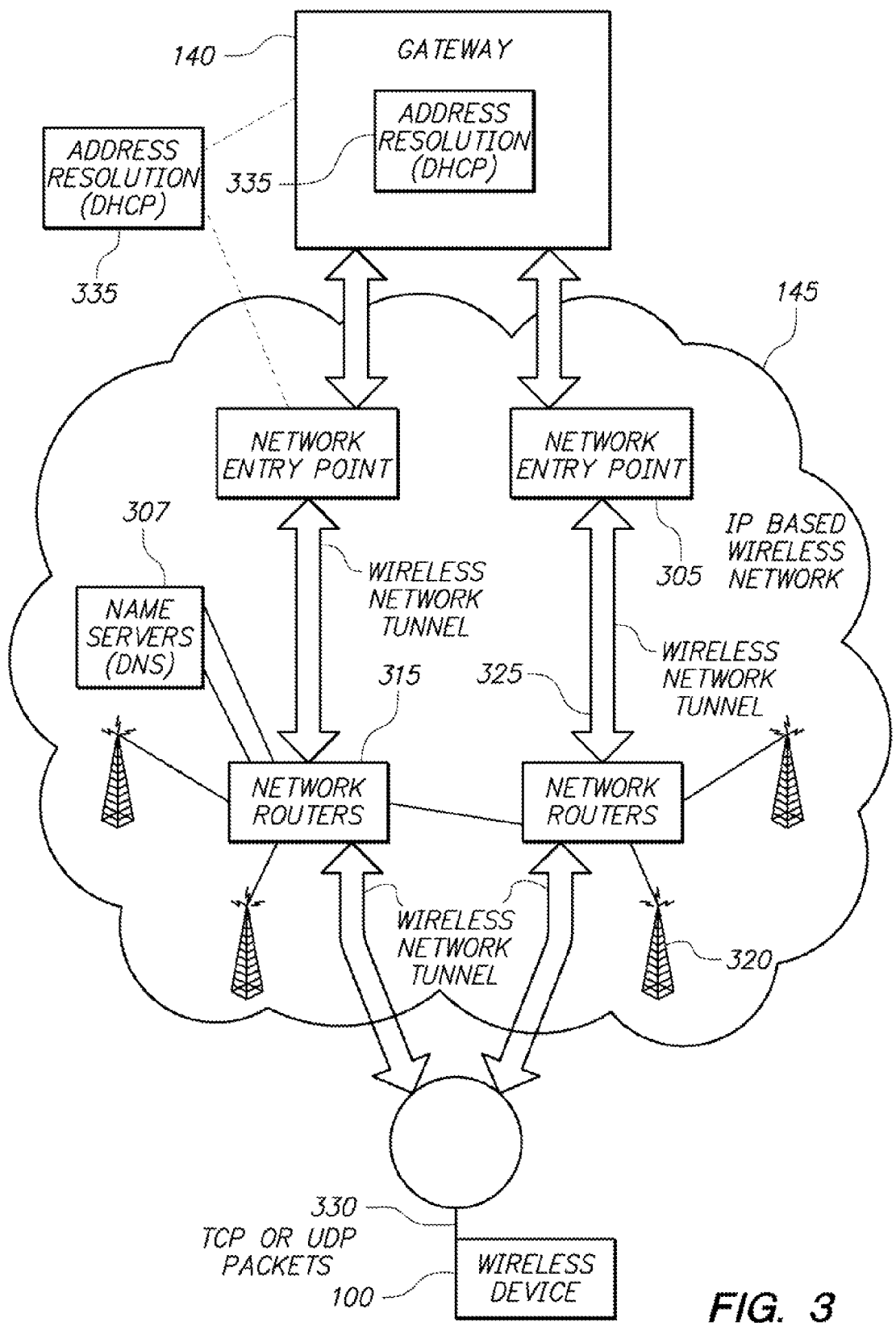
FIG. 3 is a particular system architecture for the mobile station and wireless network of FIGS. 1 and 2 for "pushed" data communications.
Figure 4:
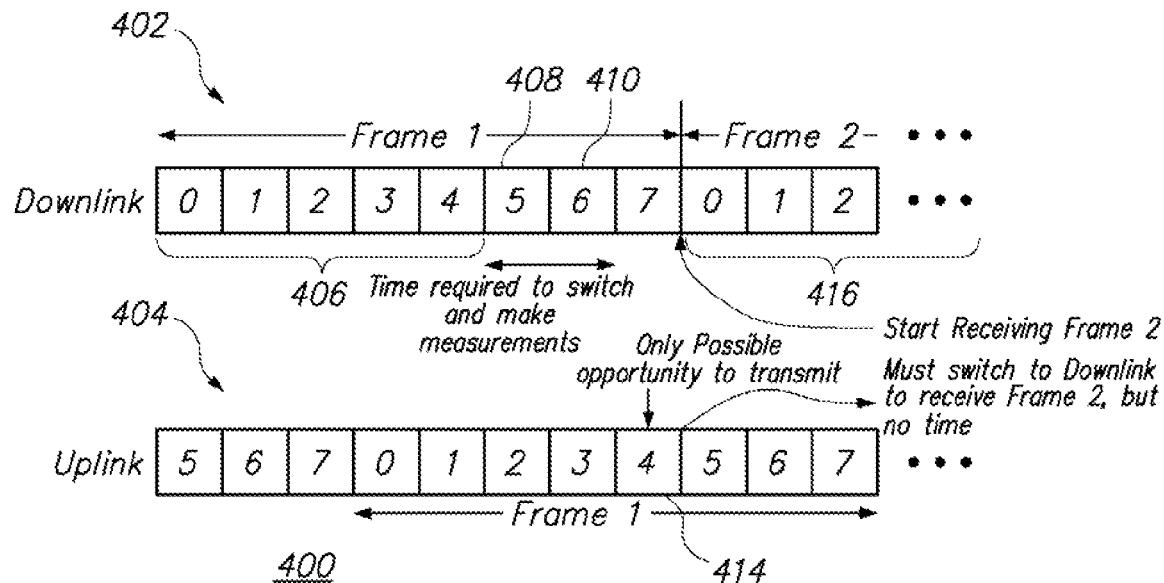
FIGS. 4 and 5 are timing diagrams for use in illustrating problems associated with assigning or allocating a mobile station additional downlink time slots for increased data throughput.
Figure 5:
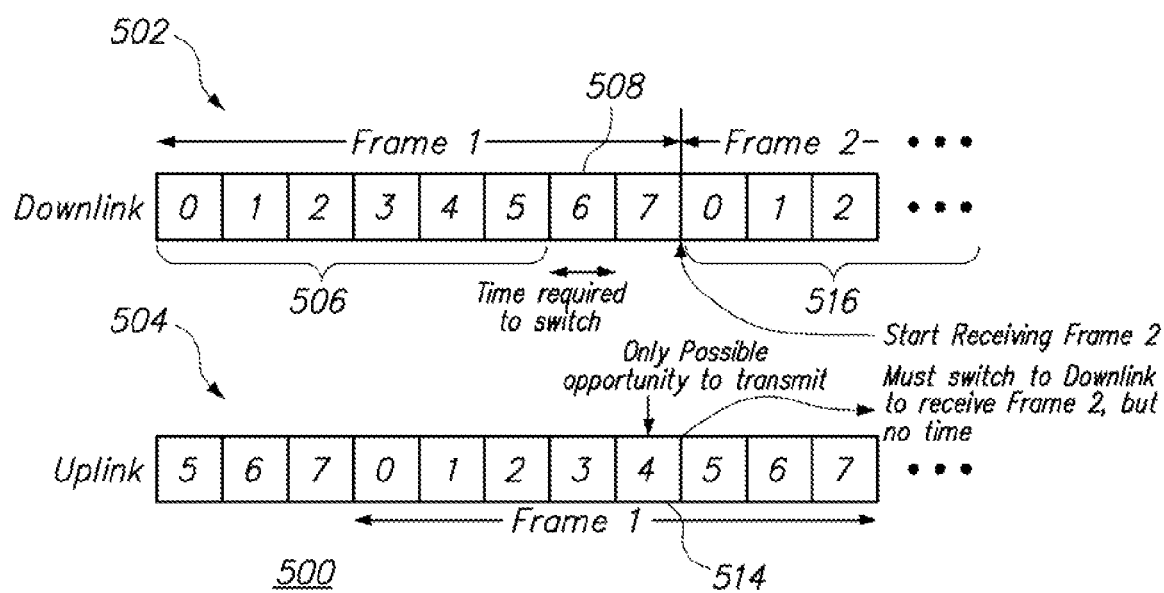

FIG. 3 shows a particular system structure for communicating with a mobile station. In particular, FIG. 3 shows basic components of an IP-based wireless data network which may be utilized for "pushed" data communications. A mobile station 100 communicates with a wireless packet data network 145, and may also be capable of communicating with a wireless voice network (not shown). As shown in FIG. 3, a gateway 140 may be coupled to an internal or external address resolution component 335 and one or more network; entry points 305. Data packets are transmitted from gateway 140, which is source of information to be transmitted to mobile station 100, through network 145 by setting up a wireless network tunnel 325 from gateway 140 to mobile station 100. In order to create this wireless tunnel 325, a unique network address is associated with mobile station 100. In an IP-based wireless network, however, network addresses are typically not permanently assigned to a particular mobile station 100 but instead are dynamically allocated on an as-needed basis. It is thus preferable for mobile station 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry-points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the internet, to look up destinations for routing data messages. Fixed transceiver stations 320, as described above, provide wireless links to mobile stations such as mobile station 100.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 100 must use a specific technique associated with wireless network 345. The step of opening such a wireless tunnel 325 may require mobile station 100 to indicate the domain, or network, entry point 305 with which it wishes to open wireless tunnel 325. In this example, the tunnel first reaches network router 315 which uses name server 30 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 100 and communicated to gateway 140, information can then be forwarded from gateway 140 to mobile station 100.

Figure 8:
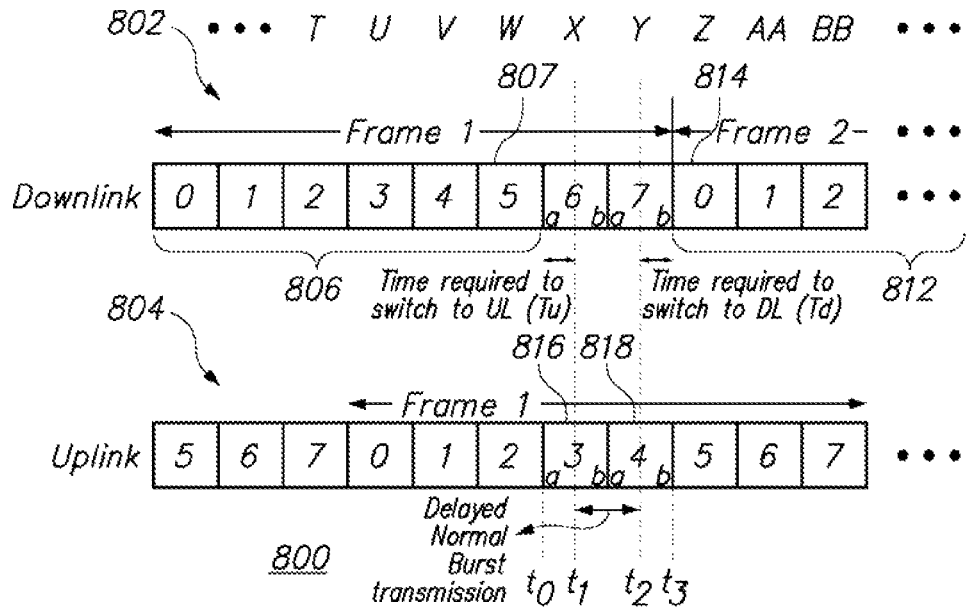
FIGS. 8-10 are illustrations of timing diagrams and data burst formats for data burst techniques which utilize a predefined data burst format of the wireless communication network.

Referring ahead to FIG. 8, a timing diagram 800 is shown for illustrating data burst communication techniques of the present disclosure, which may be utilized in the wireless networks described in relation to FIGS. 1-3 for increasing the data throughput to the mobile station. Timing diagram 800 reveals the structure of a plurality of downlink time slots 802 (top row) and a plurality of uplink time slots 804 (bottom row) of a wireless communication system. Data are communicated between a plurality of mobile stations and a base station of a wireless communication network in a plurality of data bursts contained within downlink and uplink time slots 802 and 804 assigned to each mobile station. Downlink time slots 802 are designated as 0 through 7 in the figure, for a total of eight (8) possible downlink time slots 802 per data frame in the wireless communication system. Also as shown, uplink time slots 804 are designated as 0 through 7 in the figure, for a total of eight (8) possible uplink time slots 804 per data frame in the wireless communication system. In this wireless communication system, the boundaries of each downlink; time slot 802 are in exact time alignment with the corresponding boundaries of each uplink time slot 804. Shown as being numerically staggered in relation to the uplink time slots, downlink time slots 0, 1, 2, 3, 4, 5, 6, and 7 have and cover the same time period as uplink time slots 5, 6, 7, 0, 1, 2, 3, and 4, respectively. Downlink and uplink time slots 802 and 804 are further designated in the figure with letters as follows: downlink time slot 2=T, 3=U, 4=V, 5=W, 6=X, and 7=Y for the first data frame, and downlink time slot 0=Z, 1=AA, 2=BB, etc. for the second data frame.

Data throughput to a mobile station may be increased by increasing the number of downlink time slots 802 assigned to the mobile station. However, increasing the number of downlink time slots 802 assigned to the mobile station correspondingly decreases the number of uplink time slots 804 assigned to the mobile station. In any event, at least one uplink time slot per data frame should be assigned to and utilized by the mobile station for data transmission from the mobile station. In the example of FIG. 8, six (6) downlink time slots 806 are assigned to the mobile station for data reception (i.e. downlink time slots 0, 1, 2, 3, 4, and 5) and two (2) uplink time slots 816 and 818 are assigned to the mobile station for data transmission (i.e. uplink time slots 3 and 4) for each data frame. The following data frame in timing diagram 800 shows a portion of the next six (6) downlink time slots 812 for data reception (i.e. downlink time slot 0, 1, 2, etc.). Using conventional data burst techniques in the wireless communication system, however, the time it takes to switch the wireless transceiver of the mobile station from receive to transmit mode, and then back from transmit to receive mode, would have to occupy portions of uplink time slots 816 and 818 such that data transmission having proper formatting within uplink time slots 816 and 818 would be impossible. Therefore, the time, slot assignment scenario of FIG. 8 is unrealistic, unless some special techniques are utilized.

Accordingly, the following techniques may be utilized by the mobile station to employ the exemplary time slot scenario of FIG. 8 to gain data throughput advantage. A computer program product of the present disclosure may include a computer readable medium and computer instructions stored in the computer readable medium for executing the described functionality by one or more processors (e.g. a microprocessor or DSP as described in relation to FIG. 2). To begin, the processor of the mobile station tunes the wireless transceiver to a proper receive frequency for receiving data. When the wireless transceiver is tuned to the proper receive frequency, data is received through the wireless transceiver in data bursts of downlink time slots 806. Including downlink time slot 807 which is the last downlink time slot in the data frame ("Frame 1"). At a time t0, during a time slot portion "a" of uplink time slot 816 which follows downlink time slot 807, the processor causes the wireless transceiver to be tuned to a proper transmit frequency for transmitting data. Note that it may take up to a time duration Tu to tune the wireless transceiver to the proper transmit frequency. At a time $t_1$ during a time slot portion "b" of uplink time slot 816 which follows the time slot portion "a" of uplink time slot 816, the processor causes a data burst to be transmitted via the wireless transceiver. The time slot portion "a" of uplink time slot 816 may have a time duration that is the same as or greater than the time duration Tu.

The processor allows this data burst to continue to be transmitted during a time slot portion "a" of uplink time slot 818 which follows uplink time slot 816, even over and during the boundary between uplink time slots 816 and 818. At a time $t_2$ which is the end of the time slot portion "a" of uplink time slot 818 and the beginning of a time slot portion "b" of uplink time slot 818, the transmission of the data burst ends and the processor of the mobile station begins to retune the wireless transceiver to the proper receive frequency. Note that it may take up to a time duration Td to retune the wireless transceiver to the proper receive frequency. At a time $t_3$, which is the end of the time slot portion "b", the wireless transceiver is tuned to the proper receive frequency. The time slot portion "b" of uplink, time slot 818 may have a time duration that is the same as or greater than the time duration Td. Thereafter, data may be received in data bursts in the upcoming downlink time slots 812 including first downlink time slot 814 of the new data frame ("Frame 2"). This entire process described from receive mode to transmit mode, and back; to receive mode, may or may not be repeated for each data frame.

Thus, despite a relatively large number of downlink time slots assigned to the mobile station, and considering the time it takes to time and retime the wireless transceiver, the mobile station is still well able to transmit data through the wireless communication network in each data frame using the present techniques.

In the present embodiment, the data burst transmitted over the time slot portion "b" of time slot 816 and the time slot portion "a" of time slot 818 is formatted in accordance with a predefined data burst format of the wireless communication system. This predefined data burst format is the "normal" data burst format utilized for data communications in the wireless communication system. The predefined "normal" data burst format has a length (e.g. bit length) corresponding to a time duration of a given time slot in the wireless communication system; that is, the length of the predefined data burst format is defined so as to match the time duration of any given time slot, in the wireless communication system. Thus, the data burst formatted in accordance with the predefined data burst format which is transmitted over the time slot portion "b" of time slot 816 and the time, slot portion "a" of time slot 818 has the same format as any other data burst communicated in the wireless communication system, but is merely delayed in transmission by the time duration Tu and transmitted across normal time slot boundaries.

Figure 9:
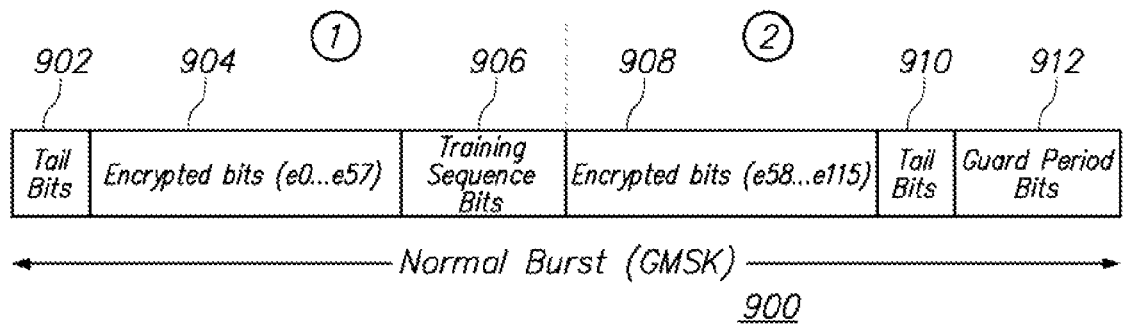
Figure 10:
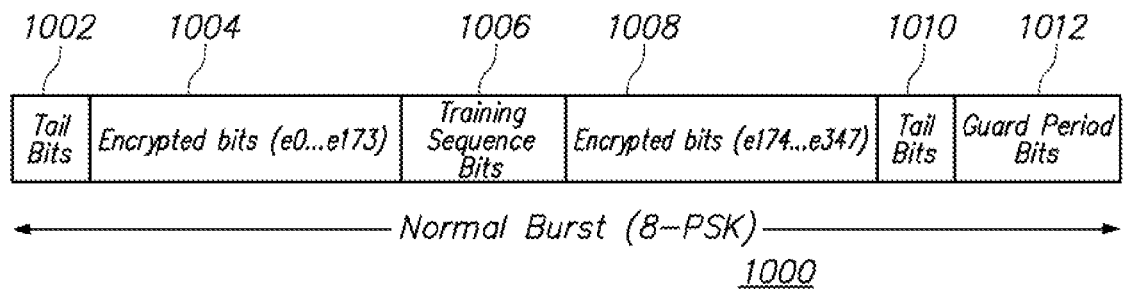

Two types of such predefined data burst formats 900 and 1000 are shown, in FIGS. 9 and 10. Such predefined data burst formats 900 and 1000 are defined in GSM specifications. Predefined data burst format 900 in FIG. 9 is the conventional format utilized for wireless transceivers employing Gaussian Minimum Shift Keying (GSMK) techniques. On the other hand, predefined data burst format 1000 in FIG. 10 is the conventional format utilized for wireless transceivers employing 8-Phase Shift Keying (8-PSK) techniques. In FIG. 9, predefined data burst format 900 has a first tail bits field 902, a first encrypted bits field 904, a training sequence bits field 906, a second encrypted bits field 908, a second tail bits field 910, and a guard period bits field 912, in the order specified in the FIG. 9. Encrypted bits field 904 contains encrypted data bits e0 through e57, and encrypted bits field 908 contains encrypted data bits e58 through e115. Together, encrypted bits field 904 and 908 define a payload size for the data burst. In FIG. 10, predefined data burst format 1000 has a first tail bits field 1002, a first encrypted bits field 1004, a training sequence bits field 1006, a second encrypted bits field 1008, a second tail bits field 1010, and a guard period bits field 1012, in the order specified in the FIG. 10. Encrypted bits field 1004 contains encrypted data bits e0 through e173, and encrypted bits field 1008 contain encrypted data bits e174 through e347. Together, encrypted bits field 1004 and 1008 define a payload size for the data burst.

Figure 11:
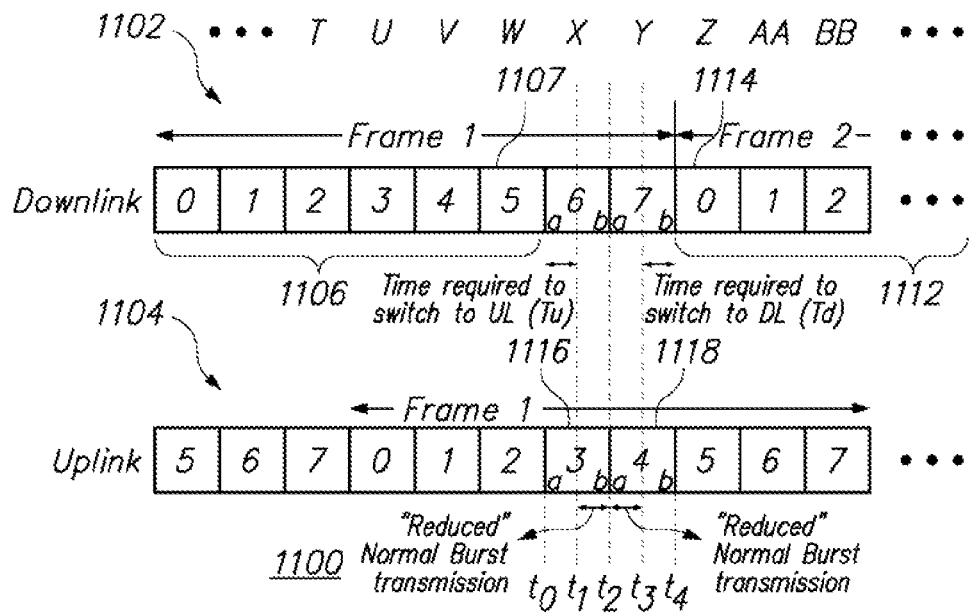
FIGS. 11-12 are illustrations of timing diagrams and a "reduced" data burst format for data burst techniques which utilize both the predefined data burst format and the reduced-size data burst format.

FIG. 11 is a timing diagram 1100 for use in illustrating alternative techniques of the present disclosure. Timing diagram 1100 reveals the structure of a plurality of downlink, time slots 1102 (top row) and a plurality of uplink time slots 1104 (bottom row) of a wireless communication system. Data are communicated between the plurality of mobile stations and a base station of the wireless communication network in a plurality of data bursts contained within downlink and uplink time slots 1102 and 1104 assigned to each mobile station. Downlink time slots 1102 are designated as 0 through 7 in the figure, for a total of eight (8) possible downlink, time slots 1102 per data frame in the wireless communication system. Also as shown, uplink time slots 1104 are designated as 0 through 7 in the figure, for a total of eight (8) possible uplink time slots 1104 per data frame in the wireless communication system. In this wireless communication system, the boundaries of each downlink time slot 1102 are in exact time alignment with the corresponding boundaries of each uplink time slot 1104. Shown as being numerically staggered in relation to the uplink time slots, downlink time slots 0, 1, 2, 3, 4, 5, 6, and 7 have and cover the same time period as uplink time slots 5, 6, 7, 0, 1, 2, 3, and 4, respectively. Downlink and uplink time slots 1102 and 1104 are further designated in the figure with letters as follows: downlink time slot 2=T, 3=U, 4=V, 5=W, 6=X, and 7=Y for the first data frame, and downlink time slot 0=Z, 1=AA, 2=BB, etc. for the second data frame.

Again, data throughput to the mobile station may be increased by increasing the number of downlink time slots 1102 assigned to the mobile station. However, increasing the number of downlink time slots 1102 assigned to the mobile station correspondingly decreases the number of uplink time slots 1104 assigned to the mobile station. In any event, at least one uplink time slot per data frame should be assigned to and utilized by the mobile station for data transmission from the mobile station. In the example of FIG. 11, six (6) downlink time slots 1106 are assigned to the mobile station for data reception (i.e. downlink time slots 0, 1, 2, 3, 4, and 5) and two (2) uplink time slots 1116 and 1118 are assigned to the mobile station for data transmission (i.e. uplink time slots 3 and 4) for each data frame. The following data frame in timing diagram F100 shows a portion of the next six (6) downlink time slots 1112 for data reception (i.e. downlink time slot 0, 1, 2, etc.). Using conventional data burst techniques in the wireless communication system, however, the time it takes to switch the wireless transceiver of the mobile station from receive to transmit mode, and then back from transmit to receive mode, would have to occupy portions of uplink time slots 1116 and 1118 such that data transmission having proper formatting within uplink time slots 1116 and 1118 would be impossible. Therefore, the time slot assignment scenario of FIG. 11 is unrealistic, unless some special techniques are utilized.

Accordingly, the following techniques may be utilized by the mobile station to employ the exemplary time slot scenario of FIG. 11 to gain data throughput advantage. Again, a computer program product of the present disclosure may include a computer readable medium and computer instructions stored in the computer readable medium for executing the described functionality by one or more processors (e.g. a microprocessor or DSP as described in relation to FIG. 2). To begin, the processor of the mobile station tunes the wireless transceiver to a proper receive frequency for receiving data. When the wireless transceiver is tuned to the proper receive frequency, data is received through the wireless transceiver in data bursts having the predefined data burst format (e.g. see previous discussion in relation to FIGS. 9 and 10) within downlink time slots 1106, including downlink, time slot 1107 which is the last downlink, time slot in the data frame ("Frame 1"). At a time to, during a time slot portion "a" of uplink time slot 1116 which follows downlink time slot 1107, the processor causes the wireless transceiver to be tuned to a proper transmit frequency for transmitting data. Note that it may take up to a time duration Tu to tune the wireless transceiver to the proper transmit frequency. The time slot portion "a" of uplink time slot 1116 may have a time duration that is the same as or greater than the time duration Tu.

At a time $t_1$, during a time slot portion "b" of uplink time slot 1116 which follows the time slot portion "a" of uplink time slot 1116, the processor causes a "reduced-size" data burst to be transmitted via the wireless transceiver. The reduced-size data burst has a reduced size data burst format as compared to the predefined data burst format of the wireless communication system. At a time $t_2$, which is the end of the time slot portion "b" of uplink time slot 1116 and the beginning of a time slot portion "a" of uplink time slot 1118, the transmission of the reduced-size data burst ends. At a time $t_2$, during a time slot portion "a" of uplink time slot 1118 which follows the time slot portion "b" of uplink time slot 1116, the processor causes another reduced-size data burst to be transmitted via the wireless transceiver. Again, the reduced-size data burst has a reduced size data burst format as compared to the predefined data burst format of the wireless communication system. At a time $t_3$, which is the end of the time slot portion "a" of uplink time slot 1118 and the beginning of a time slot portion "b" of uplink time slot 1118, the transmission of the reduced-size data burst ends and the processor of the mobile station begins to retune the wireless transceiver to the proper receive frequency. Note that it may take up to a time duration Td to retune the wireless transceiver to the proper receive frequency. At a time $t_4$, which is the end of the time slot portion "b" of uplink time slot 1118, the wireless transceiver is tuned to the proper receive frequency. The time slot portion "h" of uplink time slot 1118 may have, a time duration that is the same as or greater than the time duration Td. Thereafter, data may be received in data bursts of the predefined data burst format in the upcoming downlink time slots 1112 including first downlink time slot 1114 of the new data frame. This entire process described from receive mode to transmit mode, and back to receive mode, may be repeated for each data frame.

As described above, the reduced-size data bursts transmitted over the time slot portion "b" of time slot 1116 and the time slot portion "a" of time slot 1118 are each formatted in accordance with a reduced-size data burst format of the wireless communication system. Note that time slot portion a and b as described may referred to herein as "subslots." The wireless communication system has a predefined data burst format which is the "normal" data burst format utilized for data communications in the wireless communication system. The predefined "normal" data burst format has a length (e.g. bit length) corresponding to a time duration of a given time slot in the wireless communication system; that is, the length of the predefined data burst format is defined so as to match the time duration of any given time slot in the wireless communication system. In contrast, the reduced-sized data burst format has a length that is less than the length of the predefined data burst, but otherwise abides by the same format structure. The length of the reduced-sized data burst format is reduced, since the payload size defined by the reduced-size data burst format is less than the payload size of the predefined data burst format. The reduced-size data burst format has a length that corresponds to the difference between the time duration of an uplink time slot and the time duration Tu.

Figure 12:
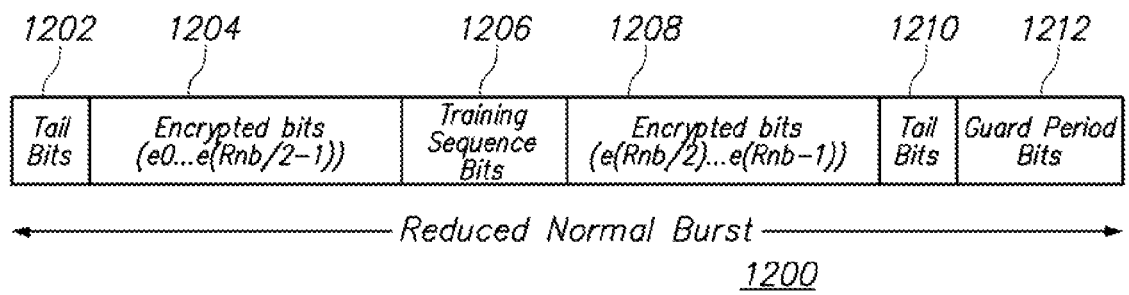

An example of such reduced-size data burst format 1200 is shown in FIG. 12. In FIG. 12, reduced-size data burst format 1200 has a first tail bits field 1202, a first encrypted bits field 1204, a training sequence bits field 1206, a second encrypted bits field 1208, a second tail bits field 1210, and a guard period bits field 1212, in the order specified in the FIG. 12. Together, encrypted bits field 1204 and 1208 define the payload size for the data burst. Encrypted bits field 1204 contains encrypted data bits e0 through e(Rnb/2−1), and encrypted its field 1208 contains encrypted data bits e(Rnb/2) through e(Rnb−1). Rnb is a value that depends on the communication technology and is described below. As apparent, reduced-sized data burst format 1200 is substantially the same as formats 900 and 1000 of FIGS. 9 and 10, except that it has a reduced length and payload size.

For GMSK, Rnb=116−Tu=116−Td. The resulting Rnb value should be rounded down to the next lowest even number. For example, if Tu=Td=3, then Rnb=116−3=113=>112 (to be divisible by 2 and placed equally on both sides of the training sequence). For 8-PSK, Rub=348−(3*Tu)=348−(3*Td). The resulting Rnb value should be rounded down to the next lowest even number which also should be divisible by 3 to satisfy 8-PSK modulation scheme. For example if Tu=Td=3, then Rnb=348−9=339=>336. If Tu and Td are different, then the number of encrypted bits that can be carried in uplink time slots 3 and 4 would be different, but this would introduce more complexity to the system. To reduce any additional overhead on the wireless network, the following attributes may be assumed when 6D+ 1U timeslot configuration is used. On the network side, the wireless network always assigns time slot 3 and 4 for uplink transfer (where the mobile station only utilizes a part of it), the downlink data is always assigned on downlink time slots 0, 1, 2, 3, 4, and 5, and Tu and Td may each be a fixed offset value agreed upon between the mobile station and the wireless network. On the mobile side, the maximum allowed value for Tu (and Td) corresponds to 58 symbols for data transmission in a single uplink time slot. Anything lower than this value would allow the mobile station to transmit more than 116 data symbols across uplink, times slots 3 and 4, which would correspond to a bandwidth of more than a single uplink time slot.

Thus again, despite a relatively large number of downlink time slots assigned to the mobile station, and considering the time it takes to tune and retune the wireless transceiver, the mobile station is still well able to transmit data through the wireless communication network in each data frame using the present techniques.

Figure 13:
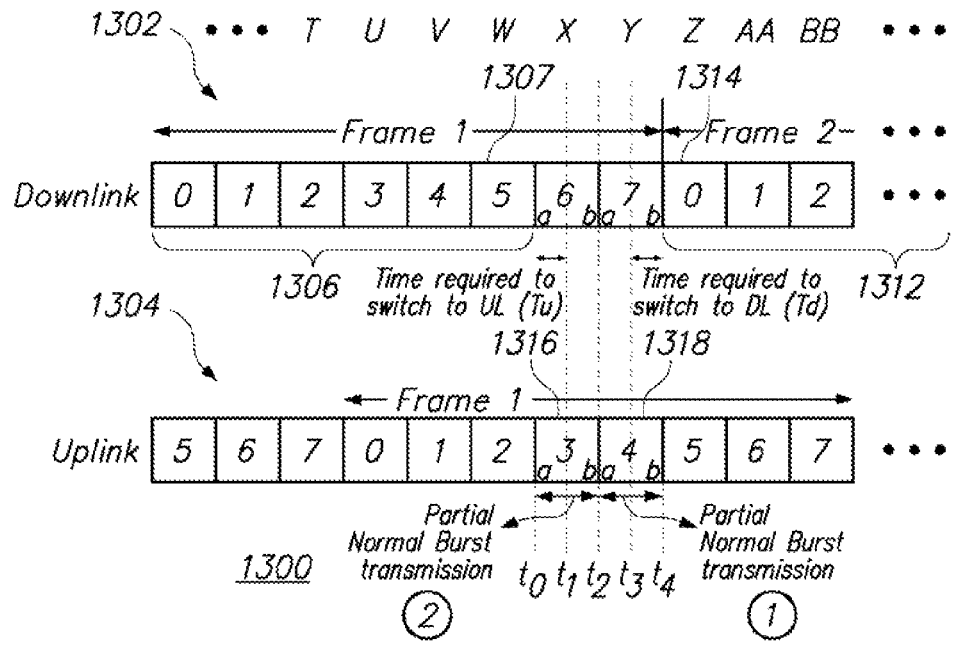
FIGS. 13-14 are illustrations of timing diagrams and "reduced" or "partial" data burst formats for data burst techniques which utilize both the predefined data burst format and the reduced or partial data burst formats, where the reduced or partial data burst formats are defined as portions of the predefined data burst format.

FIG. 13 is a timing diagram 1300 for use in illustrating yet further alternative techniques of the present disclosure. Timing diagram 1300 reveals the structure of a plurality of downlink time slots 1302 (top row) and a plurality of uplink time slots 1304 (bottom row) of a wireless communication system. Data are communicated between the plurality of mobile stations and a base station of the wireless communication network in a plurality of data, bursts contained within downlink and uplink time slots 1302 and 1304 assigned to each mobile station. Downlink time slots 1302 are designated as 0 through 7 in the figure, for a total of eight (8) possible downlink time slots 1302 per data frame in the wireless communication system. Also as shown, uplink time slots 1304 are designated as 0 through 7 in the figure, for a total of eight (8) possible, uplink time slots 1304 per data frame in the wireless communication system. In this wireless communication system, the boundaries of each downlink time slot 1302 are in exact time alignment, with the corresponding boundaries of each uplink time slot 1304. Shown as being numerically staggered in relation to the uplink time slots, downlink time slots 0, 1, 2, 3, 4, 5, 6, and 7 have and cover the same time period as uplink time slots 5, 6, 7, 0, 1, 2, 3, and 4, respectively. Downlink and uplink time slots 1302 and 1304 are further designated in the figure with letters as follows: downlink time slot 2=T, 3=U, 4=V, 5=W, 6=X, and 7=Y for the first data frame, and downlink time slot 0=Z, 1=AA, 2=BB, etc. for the second data frame.

Again, data throughput to the mobile station may be increased by increasing the number of downlink time slots 1302 assigned to the mobile station. However, increasing the number of downlink time slots 1302 assigned to the mobile station correspondingly decreases the number of uplink time slots 1304 assigned to the mobile station. In any event, at least one uplink time slot per data frame should be assigned to and utilized by the mobile station for data transmission from the mobile station. In the example of FIG. 13, six (6) downlink time slots 1306 are assigned to the mobile station for data reception (i.e. downlink time slots 0, 1, 2, 3, 4, and 5) and two (2) uplink time slots 1316 and 1318 are assigned to the mobile station for data transmission (i.e. uplink time slots 3 and 4) for each data frame. The following data frame in timing diagram 1300 shows a portion of the next six (6) downlink time slots 1312 for data reception (i.e. downlink time slot 0, 1, 2, etc.). Using conventional data burst techniques in the wireless communication system, however, the time it takes to switch the wireless transceiver of the mobile station from receive to transmit mode, and then back from transmit to receive mode, would have to occupy portions of uplink time slots 1316 and 1318 such that data transmission having proper formatting within uplink time slots 1316 and 1318 would be impossible. Therefore, the time slot assignment scenario of FIG. 13 is unrealistic, unless some special techniques are utilized.

Accordingly, the following techniques may be utilized by the mobile, station to employ the exemplary time slot scenario of FIG. 13 to gain data throughput advantage. A computer program product of the present disclosure may include a computer readable medium and computer instructions stored in the computer readable medium for executing the described functionality by one or more processors (e.g. a microprocessor or DSP as described in relation to FIG. 2). To begin, the processor of the mobile station tunes the wireless transceiver to a proper receive frequency for receiving data. When the wireless transceiver is tuned to the proper receive frequency, data is received through the wireless transceiver in data bursts having the predefined data burst format (e.g. see previous discussion in relation to FIGS. 9 and 10) within downlink time slots 1306, including downlink time slot 1307 which is the last downlink time slot in the data frame ("Frame 1"). At a time $t_0$, during a time slot portion "a" of uplink time slot 1316 which follows downlink time slot 1307, the processor causes the wireless transceiver to be tuned to a proper transmit frequency for transmitting data. Note that it may take up to a time duration Tu to tune the wireless transceiver to the proper transmit frequency. The time slot portion "a" of uplink time slot 1316 may have a time duration that is the same as or greater than the time duration Tu.

At a time $t_1$, during a time slot portion "b" of uplink time slot 1316 which follows the time slot portion "a" of uplink time slot 1316, the processor causes a first "reduced-size" data burst to be transmitted via the wireless transceiver. The first reduced-size data burst has a reduced-size data burst format as compared to the predefined data burst format of the wireless communication system. At a time $t_2$, which is the end of the time slot portion "b" of uplink time slot 1316 and the beginning of a time slot portion "a" of uplink time slot 1318, the transmission of the first reduced-size data burst ends. At the time $t_2$, during a time slot portion "a" of uplink time slot 1318 which follows the time slot portion "b" of uplink time slot 1316, the processor causes a second reduced-size data burst to be transmitted via the wireless transceiver. The second reduced-size data burst also has a reduced-size data burst format as compared to the predefined data burst format of the wireless communication system. At a time h, which is the end of the time slot portion "a" of uplink time slot 1318 and the beginning of a time slot portion "b" of uplink time slot 1318, the transmission of the second reduced-size data burst ends and the processor of the mobile station begins to retime the wireless transceiver to the proper receive frequency. Note that it may take up to a time duration Td to retime the wireless transceiver to the proper receive frequency. At a time $t_4$, which is the end of the time slot portion "b" of uplink time slot 1318, the wireless transceiver is tuned to the proper receive frequency. The time slot portion "b" of uplink time slot 1318 may have a time duration that is the same as or greater than the time duration Td. Thereafter, data may be received in data bursts of the predefined data burst format in the upcoming downlink time slots 1312 including first downlink time slot 1314 of the new data frame. This entire process described from receive mode to transmit mode, and back to receive mode, may be repeated for each data frame.

As described above, the wireless communication system has a predefined data burst format which is the "normal" data burst format utilized for data communications in the wireless communication system. This predefined "normal" data burst format has a length (e.g. bit length) corresponding to a time duration of a given time slot in the wireless communication system; that is, the length of the predefined data burst format is defined so as to match the time duration of any given time slot in the wireless communication system. See, for example, the previous discussion in relation to FIGS. 9 and 10. The predefined data burst format may be represented in two portions, such as a first portion and a second portion which follows the first portion. In FIG. 9, predefined data burst format 900 is shown divided info a first portion (labeled as "1") and a second portion (labeled as "2"). Preferably, the reduced-sized data burst format, of the first reduced-sized data burst corresponds to the second portion of predefined data burst format 900 (without the first portion), and the reduced-size data burst format of the second reduced-sized data burst corresponds to the first portion of predefined data burst-format 900 (without the second portion). In this case, the first portion corresponds to the time duration of time slot portion "a" of uplink time slot 1318 and the second portion corresponds to the time duration of time slot portion "b" of uplink time slot 1316. Note that these time slot portions as described may referred to herein as "subslots."

Figure 14:
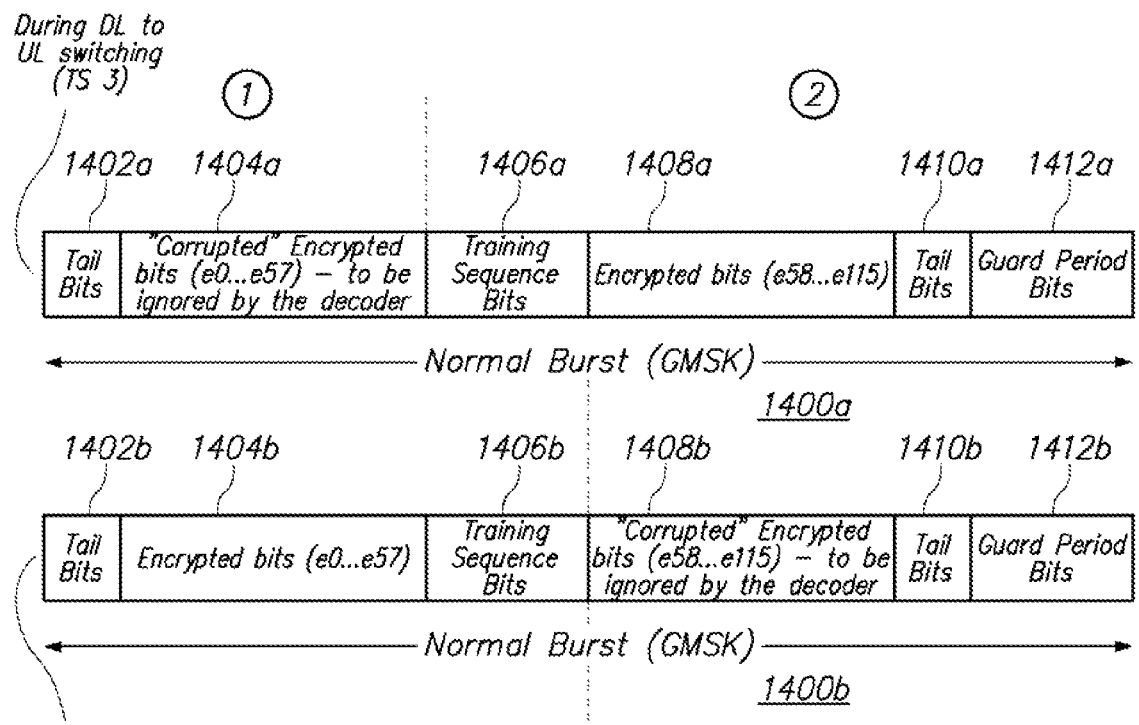

Examples of such reduced-size data burst formats are shown in FIG. 14 with further illustration, where the wireless technique utilized is GMSK. In FIG. 14, the first reduced-sized data burst format is defined in accordance with the second portion of predefined data burst format 1400*a*, and the second reduced-sized data burst format is defined in accordance with the first portion of predefined data burst format 1400*b*. Predefined data burst format 1400*a* has a tail bits field 1402*a*, a first encrypted bits field 1404*a*, a training sequence bits field 1406*a*, a second encrypted bits field 1408*a*, a tail bits field 1410*a*, and a guard period bits field 1412*a*. In this example, the first reduced-sized data burst format includes the second portion of predefined data burst format 1400*a*, and this may include training sequences bits field 1406*a*, second encrypted bits field 1408*a*, tail bits field 1410*a*, and guard period bits field 1412*a*. Tail bits field 1402*a* and first encrypted bits field 1404*a* are not included in the first reduced-sized data burst format, as this is the time over which the wireless transceiver is retuned. Similarly, predefined data burst format 1400*b* has a tail bits field 1402*b*, a first encrypted bits field 1404*b*, a training sequence bits field 1406*b*, a second encrypted bits field 1408*b*, a tail bits field 1410*b*, and a guard period bits field 1412*b*. The second reduced-sized data burst format includes the first portion of predefined data burst format 1400*b*, and this may include tail bits field 1402*b*, first encrypted bits field 1404*b*, and training sequence bits field 1406*b*. Second encrypted bits field 1408*b*, tail bits field 1410*b*, and guard period bits field 1412*b* are not included in the second reduced-sized data burst format, as this is the time over which the wireless transceiver is tuned.

Encoding/decoding in this manner may be viewed as essentially ignoring the first and second portions of the predefined data burst formats within the time slots. The mobile station operates to encode and transmit data during uplink time slot 1316 of FIG. 13 by refraining from encoding transmit data in accordance with portion 1 of predefined data burst format 1400*a* of FIG. 14, but rather encoding the transmit data in accordance with portion 2 of predefined data, burst format 1400*a*, as transceiver switching is being performed during the time duration Tu. Similarly, the mobile station operates to encode and transmit data during uplink time slot 1318 of FIG. 13 by encoding the transmit data in accordance with portion 1 of predefined data burst format 1400*b*, without encoding any additional transmit, data in accordance with portion 2 of predefined data burst format 1400*b*, as transceiver switching is being performed during the time duration Td. On the decoding side, the receiver and/or decoder operates to essentially ignore any data within the time slot portion "a" of uplink time slot 1316 and the time slot, portion "b" of uplink time slot 1318, but otherwise decodes in accordance with the predefined data burst format.

Again, despite a relatively large number of downlink time slots assigned to the mobile station, and considering the time it takes to tune and retime the wireless transceiver, the mobile station is still well able to transmit data through the wireless communication network in each data frame using the present techniques.

Figure 15:
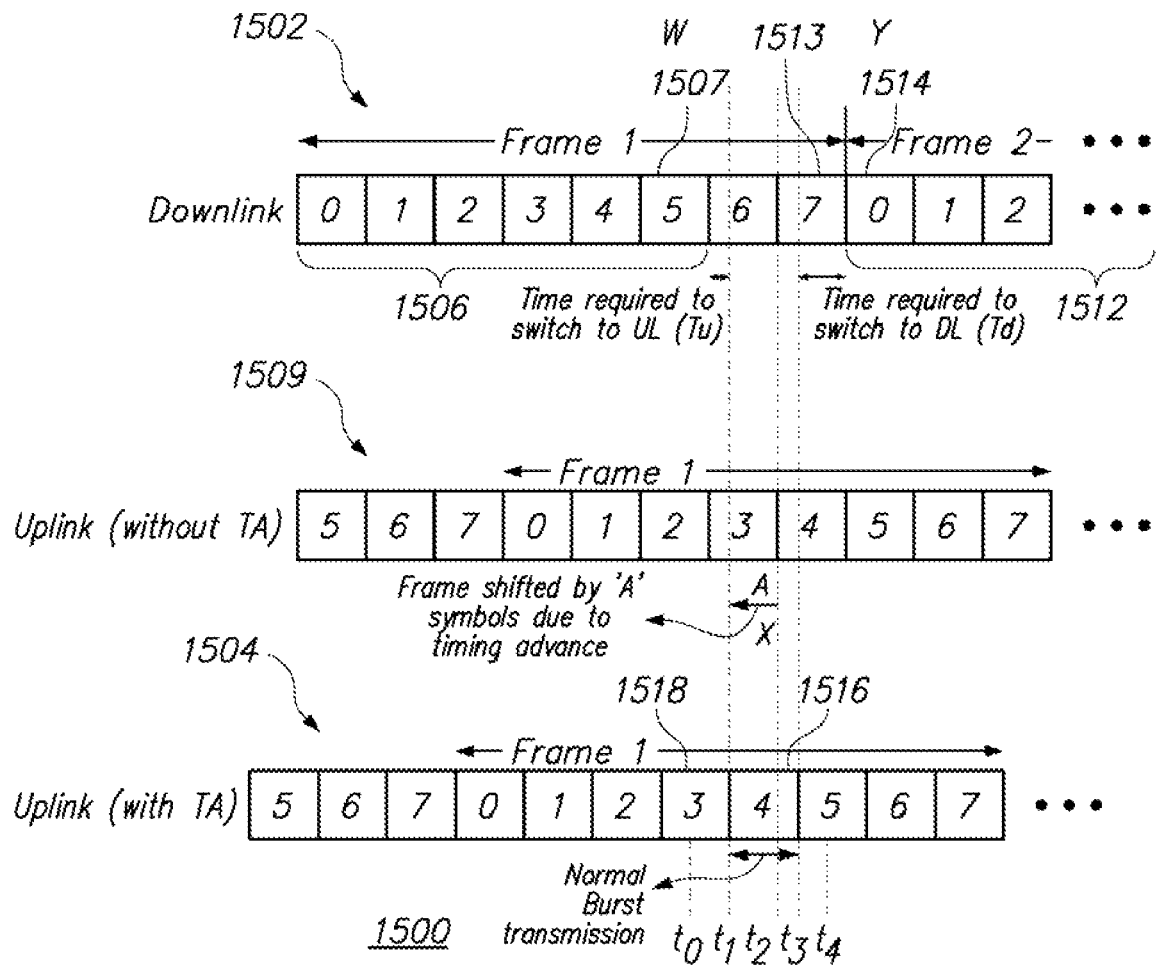
FIG. 15 is an illustration of a timing diagram which utilizes a "shifted" slot structure, where uplink time slots are shifted relative to downlink time slots of the wireless communication network.

FIG. 15 is a timing diagram 1500 for use in illustrating further techniques of the present disclosure which utilize a time adjustment (or frame-shift) for the time slot structure. Timing diagram 1500 reveals the structure of a plurality of downlink time slots 1502 (top row), a plurality of uplink time slots 1509 (middle row) where no timing adjustment is made, and a plurality of uplink time slots 1504 where timing adjustment (TA) is made. Data are communicated between a plurality of mobile stations and a base station, of a wireless communication network in a plurality of data bursts contained within downlink and uplink time slots 1502 and 1504 assigned to each mobile station. Downlink time slots 1502 are designated as 0 through 7 in the figure, for a total, of eight (8) possible downlink time slots 1502 per data frame in the wireless communication system. Also as shown, uplink time slots 1504 are designated as 0 through 7 in the figure, for a total of eight (8) possible uplink time slots 1504 per data frame in the wireless communication system.

In the wireless communication system utilizing techniques of FIG. 15, the boundaries of each downlink time slot 1502 are not in exact time alignment with the corresponding boundaries of each uplink time slot 1504; rather, downlink time slots 1502 are offset or adjusted by a fixed amount of time or symbol periods from uplink time slots 1504. Compare uplink time slots 1504 having the timing adjustment with uplink time slots 1509 which do not have the timing adjustment. In the example of FIG. 15, uplink time slots 1504 are adjusted in time by the time duration A. The time duration A may be defined by a number of symbols, which preferably in this embodiment is 48, 50, or even up to 63 symbols. In the example of FIG. 15, six (6) downlink time slots 1506 are assigned to the mobile station for data reception (i.e. downlink time slots 0, 1, 2, 3, 4, and 5) and one uplink, time slot 1516 is assigned to the mobile station for data transmission (i.e. uplink time slot 4) for each data frame. Portions of time slot 1518 (prior to uplink time slot 1516) and time slot 1513 (after uplink time slot 1516) are utilized for transceiver switching. The following data frame in timing diagram 1514 shows a portion of the next six (6) downlink time slots 1512 for data reception (i.e. downlink time slot 0, 1, 2, etc.).

Normally, the time it takes to switch the wireless transceiver of the mobile station from receive to transmit mode, and then back from transmit to receive mode, would have to occupy portions of time slots such that data transmission using the proper formatting would be impossible. However, using the exemplary time slot structure of FIG. 15, alternative techniques are possible. To begin, the processor of the mobile station tunes the wireless transceiver to a proper receive frequency for receiving data. When the wireless transceiver is tuned to the proper receive frequency, data is received through the wireless transceiver in data bursts of downlink time slots 1502, including downlink time slot 1507 which is the last downlink time slot in the data frame ("Frame 1"). At a time t0, during an end portion of uplink time slot 1518 which follows downlink time slot 1507 (which may be referred to as a frame-shift period), the processor causes the wireless transceiver to be tuned to a proper transmit frequency for transmitting data. Note that it may take up to a time duration Tu to tune the wireless transceiver to the proper transmit frequency, and at least this amount is provided by the timing adjustment.

At a time $t_1$, which is the beginning of uplink time slot 1516, the processor causes a data burst to be transmitted via the wireless transceiver. Preferably, the data burst is formatted in accordance with the predefined data burst format of the wireless communication system (e.g. see previous discussion in relation to FIGS. 9 and 10). The processor allows this data burst to continue to be transmitted within uplink time slot 1516, which crosses the boundary between the downlink, time slots at a time $t_2$. At a time $t_3$, which is the end of uplink time slot 1516 and within downlink time slot 1513, the transmission of the data burst ends.

What follows is the next frame-shift period, where it may normally be considered to retune the wireless transceiver to the proper receive frequency. Instead, however, one of the alternative types of reduced-size data burst formats (e.g. see FIGS. 12 and 14) may be utilized to transmit additional data at this time. When this transmission is complete, the processor of the mobile station begins to retune the wireless transceiver to the proper receive frequency. Note that it may take up to the time duration Td to retune the wireless transceiver to the proper receive frequency. At a time $t_4$, which is the end of a downlink time slot 1513, the wireless transceiver is tuned to the proper receive frequency. Thereafter, data may be received in data bursts in the upcoming downlink time slots 1512 including first downlink time slot 1514 of the new data frame ("Frame 2") which follows downlink time slot 1513. This entire process described from receive mode to transmit mode, and back to receive mode, may be repeated for each data frame.

Again, despite a relatively large number of downlink, time slots assigned to the mobile station, and considering the time it takes to tune and retune the wireless transceiver, the mobile station is still well able to transmit data through the wireless communication network in each data frame using the present techniques.

Thus, in the techniques of FIG. 15, data are received by a mobile station via a wireless transceiver in a downlink time slot W. After receiving the data in the downlink time slot W, the wireless transceiver is tuned for transmission during a first frame-shift period which follows the downlink time slot W, Transmit, data are read from a transmit data queue and the transmit data are encoded in a data burst in accordance with a predefined data burst format having a predefined payload size. The encoded transmit data are then transmitted in the data burst having the predefined data burst format within an uplink time slot X which follows the downlink time slot W. Note that, in the frame-shifted environment, boundaries of the downlink time slot W and the uplink time slot X are separated in time by the first frame-shift period during which the wireless transceiver was tuned. Next, additional transmit data are then read from the transmit data queue and the additional transmit data are encoded in a data burst in accordance with a reduced data burst format having a reduced payload size that is less than the predefined payload size. The encoded additional transmit data are transmitted in the data burst having the reduced data burst format, during a second frame-shift period which follows uplink time slot X. After the encoded additional transmit data are transmitted, the wireless transceiver is tuned for reception during a remaining time in the second frame-shift period. Data are then received in a downlink time slot Y which follows the uplink time slot X. Again, in the frame-shifted environment, boundaries of the uplink time slot X and the downlink time slot Y are separated in time by the second frame-shift period during which the additional transmit data was transmitted and the wireless transceiver was tuned/The timing adjustment (i.e. time duration A) may be dictated by the network based on the distance between the mobile station and its corresponding base station, on a mobile-by-mobile station basis. Preferably, however, the network operates to maximize the timing adjustment (on one end or the other) for any mobile station configured with the reduced-size data, burst capability, so that the mobile station, has sufficient time within which to transmit a reduced-size data burst during a frame-shift period. The network may identify the capability of a mobile station based on profile information for the mobile station, and/or through an indication transmitted by the mobile station to the network. Upon identifying the mobile station capability, the network operates either to maximize the timing adjustment or to select the timing adjustment solely on the distance between the mobile station and its corresponding base station.

In a first variation on the techniques of FIG. 15 described above, the mobile station causes the additional transmit data to be transmitted in the reduced-sized data burst during the first frame-shift period (e.g. between $t_0$ and $t_1$) and not the second frame-shift period (e.g. between $t_3$ and $t_4$). In a second variation on the techniques of FIG. 15, the mobile station causes first additional transmit data to be transmitted in a first reduced-sized data burst during the first frame shift period (e.g. between $t_0$ and $t_1$) and second additional transmit data to be transmitted in a second reduced-sized data burst during the second frame-shift period (e.g. between $t_3$ and $t_4$), which may assume a very efficient tuning speed at the mobile station and/or a relatively small reduced-sized data burst format.

Figure 6:
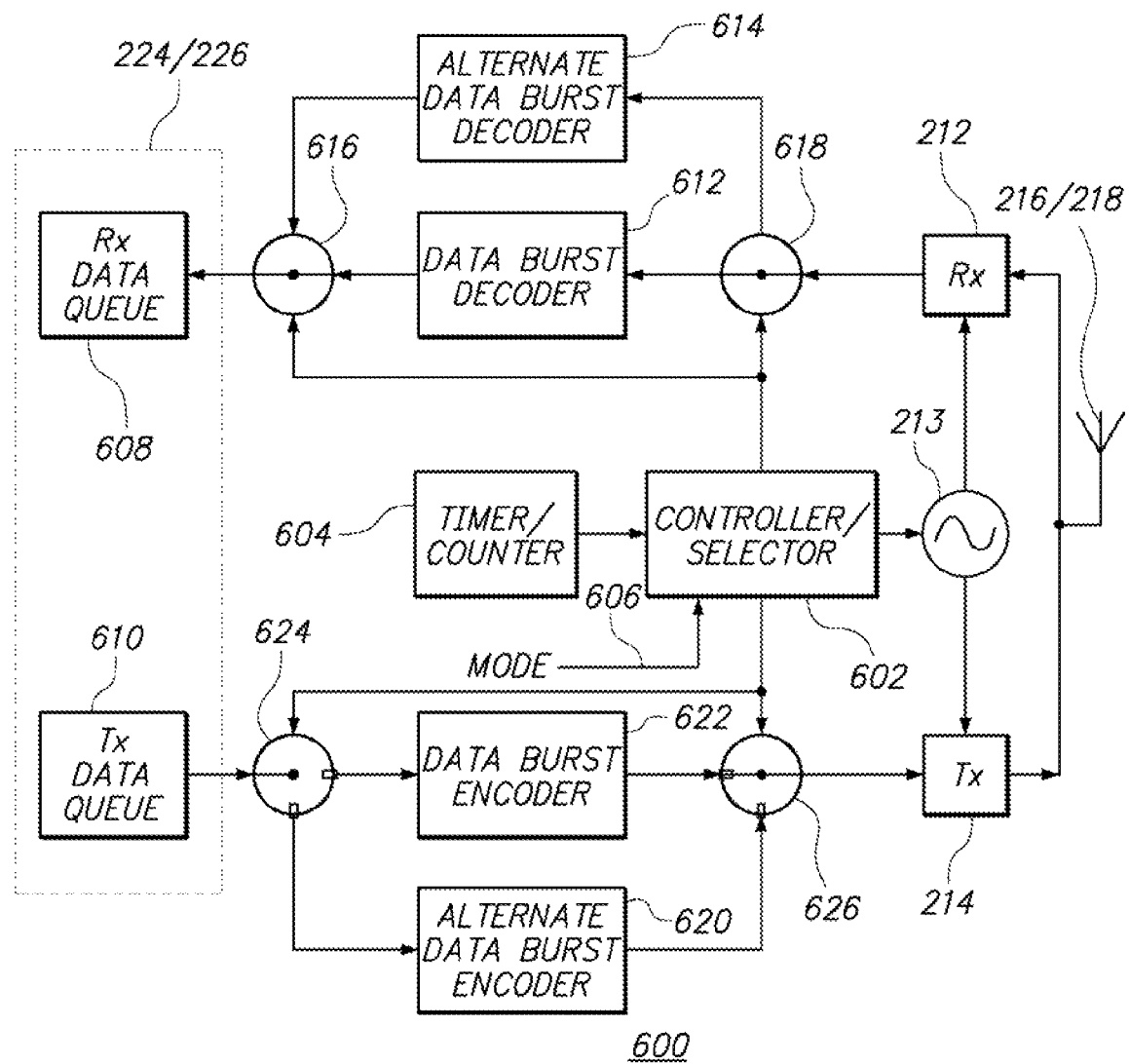
FIG. 6 is a schematic block diagram of electrical components for use in data burst communication techniques of the present disclosure.
Figure 7:
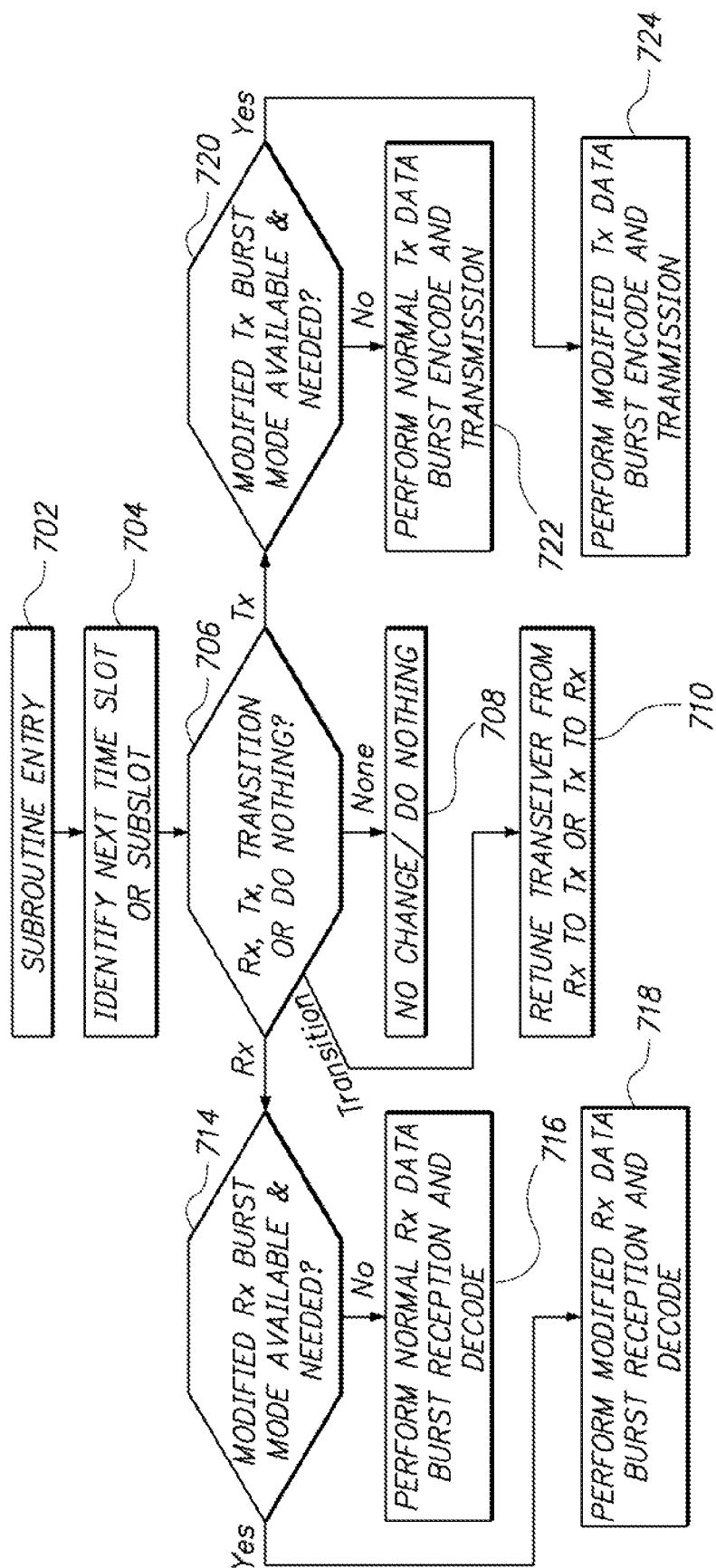
FIG. 7 is a flowchart of a method for use with the data burst communication techniques of the present disclosure, which may utilize the electrical components of FIG. 6, and the further details described in relation to FIGS. 8-15.

Referring back to FIG. 6, a schematic block diagram 600 of device components (electrical and/or functional components) which may be utilized to perform the techniques described in relation to FIGS. 8-15, as well as the flowchart of FIG. 7, is shown. Electrical components in diagram 600 may be employed in the mobile, station or in a wireless network component. In one variation, only the encoding portion or decoding portion (i.e. not both encoding and decoding portions) may be provided in the mobile station or wireless network component as needed. Note that these components may be merely illustrative of what components may be utilized to achieve the desired results, and may vary depending on the specific implantation.

As shown in FIG. 6, device components in diagram 600 include receiver 212, transmitter 214, and antenna means 216/218 from FIG. 2. The device components also include a receive data queue 608, a transmit data queue 610, a timer or counter 604, a controller or selector 602 having a mode control input 606, a decoding portion which includes a data burst decoder 612, an alternate data burst decoder 614, and an encoding portion which includes a data burst encoder 622 and an alternate data burst encoder 620. Controller 602 may be or include one or more processors of the mobile station or network component (e.g. controller 602 may be or include microprocessor 238 and/or DSP 220 of FIG. 2).

Data burst decoder 612 and data burst encoder 622 operate in accordance with the predefined data burst format of FIGS. 9 and 10, as is conventional. On the other hand, alternate data burst decoder 614 and alternate data burst encoder 620 operate in accordance with the reduced or partial data burst formats as described in relation to FIGS. 11-14, for example. Mode control input 606 provides an indication to controller 602 as to which operating mode should be utilized for data communications: normal burst mode or alternate burst mode. In the normal burst mode, the data bursts having the normal or predefined data burst format are utilized for data communications and the adjusted or reduced-size data burst format is never utilized. In the alternate burst mode, the data bursts having the appropriate normal, adjusted, or reduced-size data burst format are utilized as and when needed.

For receiving data, controller 602 utilizes switches 616 and 618 to select between the use of data burst decoder 612 and alternate data burst decoder 614 for data communications (as needed as described in relation to FIGS. 11-14, for example). In particular, receiver 212 has an output coupled to an input to switch 616, which has a first output to an input of data burst decoder 612 and a second output to an input of alternate data burst decoder 614. An output of data burst decoder 612 is coupled to a first input to switch 616, and an output of alternate data burst decoder 614 is coupled to a second input to switch 616. An output of switch 616 is coupled to an input of receive data queue 608. When controller 602 selects the use of data burst decoder 612, switches 616 and 618 are set such that receiver 212 receives data in data bursts formatted in accordance with the predefined data burst format which are fed into the input of data burst decoder 612 Data burst decoder 612 decodes the data per the predefined data burst format. The decoded data are produced at the output of data burst decoder 612 and provided in receive data queue 608 for storage, further processing, and use. On the other hand, when controller 602 selects the use of alternate data burst decoder 614, switches 616 and 618 are set such that receiver 212 receives data in data bursts formatted in accordance with the reduced or partial data burst, format which are fed into the input of alternate data burst decoder 614. Alternate data burst decoder 614 decodes the data per the reduced or partial data burst format. The decoded data are produced at the output of alternate data burst decoder 614 and provided in receive data queue 608 for storage, further processing, and use.

For transmitting data, controller 602 utilizes switches 624 and 626 to select between the use of data burst encoder 622 and alternate data burst decoder 620 for data communications (as needed as described in relation to FIGS. 11-14, for example). In particular, transmit data queue 610 has data stored therein for data transmission. An output of transmit data queue 610 is coupled to an input of switch 624. Switch 624 has a first output coupled to a first input of switch 626 and a second output coupled to a second input of switch 626. An output of switch 626 is coupled to an input to transmitter 214. When controller 602 selects the use of data burst encoder 622, switches 624 and 626 are set such that transmit data queue provides transmit data to the input of data burst encoder 622. Data burst encoder 622 encodes the data in accordance with the predefined data burst format. The output of data burst encoder 622 provides encoded data in data bursts formatted in accordance with the predefined data burst format to transmitter 214 for transmission. When controller 602 selects the use of alternate data burst encoder 620, switches 624 and 626 are set such that transmit data queue provides transmit data to the input of alternate data burst encoder 620. Alternate data burst encoder 620 encodes the data in accordance with the reduced or partial data burst format. The output of alternate data burst encoder 620 provides encoded data in data bursts formatted in accordance with the reduced or partial data burst format to transmitter 214 for transmission.

Alternative timing and adjustment may be necessary to properly transmit and receive the data bursts as described in relation to FIGS. 8-15. Thus, timer 604 is configured and set to provide periodic output signals (or periodic time references) to controller 602 for initiation of the transmission and/or reception of data burst according to the present disclosure. More specifically, timer 604 is set to provide a first periodic output signal in accordance with each time boundary of each time slot of the wireless communication system. This way, data bursts having the predefined data burst format may be properly transmitted and received at the appropriate times within the time slots defined by the system. In addition, timer 604 is set to provide a second periodic output signal in accordance with each alternative time boundary for each shifted, reduced, or partial data burst. The second periodic output signal may, or may not be, set relative to each instance of the first periodic output signal. In response to any signal of the first or the second periodic output signals, controller 602 may perform data burst reception, data burst transmission, transceiver switching, or "do nothing" (e.g. see step 706 of FIG. 7 which is described later below), in accordance with the specific variation of FIGS. 8-15 that is employed. Note that a predetermined mathematical relationship may exist between the timing between the predefined data burst and the alternative data burst-techniques (e.g. the reduced-size data burst format is exactly half the length of the predefined data burst format), such that only a single periodic time reference need be utilized (e.g. a single period time reference that is double that of each time slot occurrence) for data burst communications.

FIG. 7 is a flowchart of a method for use with the data burst communication techniques of the present disclosure, which may utilize the components described in relation to FIG. 6, and the details described in relation to FIGS. 8-15. A computer program product, of the present disclosure may include a computer readable medium and computer instructions stored in the computer readable medium for executing the logic of FIG. 7 by one or more processors (e.g. a microprocessor or DSP as described in relation to FIG. 2).

A subroutine entry 702 of FIG. 7 may be the result of a signal from a periodic output signal from a timer (e.g. timer 604 of FIG. 6). In response, a processor (e.g. controller 602 of FIG. 6) operates to identify the current time slot (or subslot as the case may be) or current time slot number for data communication (step 704 of FIG. 7). By identifying the current time slot, the processor may identify which data communications event should occur, if any, as it may keep a stored association between the time slot numbers and timing along with an indication of the desired event to perform. The processor then operates to identify whether to perform one of the following: data burst reception, data burst transmission, transceiver switching, or "do nothing" (step 706 of FIG. 7). If "do nothing" as identified at step 706, then the processor performs no event (step 708 of FIG. 7). If transceiver switching is necessary as identified at step 706, the processor controls the wireless transceiver to retune from receive mode to transmit mode, or transmit mode to receive mode, as necessary (step 710 of FIG. 7).

If data burst reception is necessary as identified at step 706, then the processor identifies whether alternate burst mode is available and needed within the current time slot (step 714 of FIG. 7). The alternate burst mode is available if both the mobile station and the wireless network have the ability to perform in the alternate burst mode, and have agreed upon operating in the alternate burst mode via a data communications exchange (e.g. at the time of registration). The alternate burst mode is needed at the appropriate time slot (or subslot) depending on the technique chosen (e.g. see discussion in relation to FIGS. 8-15). If the alternate burst mode is unavailable or not needed within the current time slot as identified in step 714, then the processor causes normal data burst reception and decoding to occur (step 716 of FIG. 7). If the alternate burst mode is available and needed within the current time slot as identified in step 714, then the processor causes alternate data burst reception and decoding to occur (step 718 of FIG. 7).

Similarly, if data burst transmission is necessary as identified at step 706, then the processor identifies whether alternate burst mode is available and needed for data transmission within the current time slot (step 720 of FIG. 7). Again, the alternate burst mode is available if both the mobile station and the wireless network have the ability to perform in the alternate burst mode, and have agreed upon operating in the alternate burst mode via a data communications exchange (e.g. at the time of registration). The alternate burst mode is needed at the appropriate time slot (or subslot) depending on the technique chosen (e.g. see discussion in relation to FIGS. 8-15). If the alternate burst mode is unavailable or not needed within the current, time slot as identified in step 720, then the processor causes normal data burst encoding and transmission to occur (step 722 of FIG. 7). If the alternate burst mode is available and needed within the current time slot as identified in step 720, then the processor causes alternate data burst encoding and transmission to occur (step 724 of FIG. 7).

Thus, as provided by the technique of FIG. 7, a method for use in providing data communications in a wireless communication system where data is communicated between a mobile station and a wireless network in a plurality of data bursts within time slots assigned to the mobile station, the technique may include the acts of identifying whether one of a normal burst mode and an alternate burst mode is to be utilized for data communication; reading data from a data queue; and if the normal burst mode is identified to be utilized for the data communication: receiving or transmitting the data in a data burst in accordance with the normal burst mode; but if the alternate burst mode is identified to be utilized for the data communication: receiving or transmitting the data in a data burst in accordance with the alternate burst mode.

Thus, several methods and apparatus for use in increasing data throughput to mobile stations in a wireless communication network have been described. One illustrative method includes the acts of receiving, through a wireless transceiver, data in a time slot W; tuning the wireless transceiver, during a first portion of a time slot. X which follows the time slot W, for transmission; reading transmit data from a transmit data queue and encoding the transmit data in a data burst in accordance with a data burst format; and causing the encoded transmit data to be transmitted in the data burst during a second portion of the time slot X. In one approach, a predefined data burst format of the wireless communication system has a length corresponding to a time duration of a given time slot in the wireless communication system, and the encoding of the transmit data in the data burst is performed in accordance with the predefined data burst format. In this case, the method includes the additional act of causing the encoded transmit data to be further transmitted in the data burst during a first portion of a time slot Y which follows the time slot X, and then tuning the wireless transceiver during a second portion of the time slot Y for reception. Using this "shifted" data burst transmission technique, extra available time remains to tune the wireless transceiver from receive to transmit mode, and from transmit to receive mode. Thus, additional downlink time slots per data frame may be allocated to the mobile station for increased data throughput, where at least one uplink time slot per data frame can be utilized for data transmission.

In one varied approach, the encoding of the transmit data in the data burst is performed in accordance with a reduced-size data burst format having a length (and data payload) that is less than the length (and the data payload) of the predefined data burst format, in this ease, additional transmit data may be encoded and transmitted in accordance with the reduced-size data burst format during the first portion of the time slot Y which follows the time slot X, followed by the tuning the wireless transceiver during the second portion of the time slot Y for reception, in another varied approach, the encoding of the transmit data in the data burst is performed in accordance with a reduced (or partial) data burst format which corresponds to a second portion or half of the predefined data burst format. Again, the reduced or partial data burst format defines a length (and data payload) that is less than the length (and the data payload) of the predefined data burst format. In this case, additional transmit data may be encoded and transmitted in accordance with another reduced or partial data burst format during the first portion of the time slot Y which follows the time slot X. This other reduced or partial data burst format may correspond to a first portion or half of the predefined data burst format. This transmission may be followed by the tuning of the wireless transceiver during the second portion of the time slot Y for reception. Using this "reduced" or "partial" data burst transmission technique, extra available time remains to tune the wireless transceiver from receive to transmit mode, and from transmit to receive mode. Again, additional downlink time slots per data frame may therefore be allocated to the mobile station for increased data throughput, where at least one uplink time slot per data frame can be utilized for data transmission.

Another illustrative method of the present disclosure includes the acts of identifying whether one of a first data burst format and a second data burst format is to be utilized for data communications via a wireless transceiver of the mobile station; reading data from a data queue; if the first data burst format is identified to be utilized for the data communications: encoding or decoding the data in accordance with the first data burst format having a first length corresponding to a time duration of a given time slot in the wireless communication system; and if the second data burst format is identified to be utilized for the data communications: encoding or decoding the data in accordance with the second data burst format having a second length that is less than the first length. When the second data burst format is utilized, extra available time remains to tune the wireless transceiver from receive to transmit mode, and transmit to receive mode. Additional downlink time slots per data frame may therefore be allocated to the mobile station for increased data throughput to the mobile station, where at least one uplink time slot per data frame can be utilized for data transmission.

The above-described embodiments of the present disclosure are intended to be examples only. For example, although the present disclosure describes a technique applicable to a GSM/GPRS or EGPRS network, the technique is also applicable to other networks such as a CDMA or other suitable network. Those of skill in the art may effect alterations, modifications and variations to the particular embodiments without departing from the scope of the application. The invention described herein in the recited claims intends to cover and embrace all suitable changes in technology.

What is claimed is:

1. A method for use in providing data communications in a wireless communication system, where data is communicated between a mobile station and a wireless communication network in a plurality of data bursts within time slots assigned to the mobile station, the method comprising the acts of:
   receiving, through a wireless transceiver, data in a time slot W;
   tuning the wireless transceiver, during a first portion of a time slot X which consecutively follows the time slot W, for transmission;
   reading transmit data from a transmit data queue and encoding the transmit data in a data burst in accordance with a data burst format; and
   causing the encoded transmit data to be transmitted in the data burst during a second portion of the time slot X, up to or across a time boundary between the time slot X and a time slot Y which consecutively follows the time slot X;
   wherein the wireless communication system has downlink time slots with time boundaries that are in time alignment with time boundaries of the uplink time slots.

2. The method of claim 1, wherein a predefined data burst format of the wireless communication system has a length corresponding to a time duration of a given time slot in the wireless communication system, and the act of encoding the transmit data comprises the further act of encoding the transmit data in the data burst in accordance with the predefined data burst format.

3. The method of claim 1, wherein a predefined data burst format of the wireless communication system has a length corresponding to a time duration of a given time slot in the wireless communication system, the method comprising the further acts of:
  wherein the act of encoding the transmit data comprises the further act of encoding the transmit data in the data burst in accordance with the predefined data burst format; and
  further causing the encoded transmit data to be transmitted in the data burst during a first portion of the time slot Y which follows consecutively the time slot X.

4. The method of claim 1, wherein a predefined data burst format of the wireless communication system has a length corresponding to a time duration of a given time slot in the wireless communication system, the method comprising the further acts of:
  wherein the act of encoding the transmit data comprises the further act of encoding the transmit data in the data burst in accordance with the predefined data burst format;
  further causing the encoded transmit data to be transmitted in the data burst during a first portion of the time slot Y which consecutively follows the time slot X; and
  after causing the encoded transmit data to be transmitted, tuning the wireless transceiver during a second portion of the time slot Y for reception.

5. The method of claim 1, wherein a predefined data burst format of the wireless communication system has a length corresponding to a time duration of a given time slot in the wireless communication system, wherein the act of encoding the transmit data comprises the further act of encoding the transmit data in the data burst in accordance with the predefined data burst format, and wherein the predefined data burst format comprises a first tail bits field, a first encrypted bits field, a training sequence bits field, a second encrypted bits field, and a second tail bits field.

6. The method of claim 1, wherein a predefined data burst format of the wireless communication system has a first length corresponding to a time duration of a given time slot in the wireless communication system and a first payload size, and the act of encoding the transmit data comprises the further act of encoding the transmit data in the data burst in accordance with a reduced-size data burst format having a second length that is less than the first length and a second payload size that is less than the first payload size.

7. The method of claim 1, wherein a predefined data burst format of the wireless communication system has a first length corresponding to a time duration of a given time slot in the wireless communication system and a first payload size, and the act of encoding the transmit data comprises the further act of encoding the transmit data in the data burst in accordance with a reduced-size data burst format having a second length that is less than the first length and a second payload size that is less than the first payload size, the method comprising the further acts of:
  reading additional transmit data from the transmit data queue and encoding the additional transmit data in the reduced-size data burst in accordance with the reduced-size data burst format; and
  causing the encoded additional transmit data to be transmitted in the reduced-size data burst during a first portion of the time slot Y which consecutively follows the time slot X.

8. The method of claim 1, wherein a predefined data burst format of the wireless communication system has a first length corresponding to a time duration of a given time slot in the wireless communication system and a first payload size, and the act of encoding the transmit data comprises the further act of encoding the transmit data in the data burst in accordance with a reduced-size data burst format associated with a second length that is less than the first length and a second payload size that is less than the first payload size, the method comprising the further acts of:
  reading additional transmit data from the transmit data queue and encoding the additional transmit data in the reduced-size data burst in accordance with the reduced-size data burst format;
  causing the encoded additional transmit data to be transmitted in the reduced-size data burst during a first portion of the time slot Y which follows consecutively the time slot X; and
  after causing the encoded additional transmit data to be transmitted, tuning the wireless transceiver during a second portion of the time slot Y for reception.

9. The method of claim 1, wherein a predefined data burst format of the wireless communication system is representable by a first portion and a second portion, the first portion including a first encrypted bits field and the second portion including a second encrypted bits field, the method comprising the further acts of:
  wherein the act of encoding the transmit data comprises the further act of encoding the transmit data in the data burst in accordance with a reduced-size data burst format defined by the second portion of the predefined data burst format without the first portion of the predefined data burst format.

10. The method of claim 1, wherein a predefined data burst format of the wireless communication system has a first length corresponding to a time duration of a given time slot in the wireless communication system, a first payload size, and representable by a first portion and a second portion, the method comprising the further acts of:
  wherein the act of encoding the transmit data comprises the further act of encoding the transmit data in the data burst in accordance with a reduced-size data burst format defined by the second portion of the predefined data burst format without the first portion of the predefined data burst format, a second length that is less than the first length, and a second payload size that is less than the first payload size.

11. The method of claim 1, wherein a predefined data burst format of the wireless communication system is associated with a time period of a given time slot in the wireless communication system and representable by a first portion and a second portion, the method comprising the further acts of:
  wherein the act of encoding the transmit data comprises the further act of encoding the transmit data in the data burst in accordance with a first reduced-size data burst format defined by the second portion of the predefined data burst format without the first portion of the predefined data burst format;
  reading additional transmit data from the transmit data queue and encoding the additional transmit data in a reduced-size data burst in accordance with a second reduced-size data burst format, the second reduced-size data burst format defined by the first portion of the predefined data burst format without the second portion of the predefined data burst format; and
  causing the encoded additional transmit data to be transmitted in the reduced-size data burst during a first portion of the time slot Y which consecutively follows the time slot X.

12. The method of claim 1, wherein a predefined data burst format of the wireless communication system has a length corresponding to a time duration of a given time slot in the wireless communication system, a first payload size, and representable by a first portion and a second portion, the method comprising the further acts of:
- wherein the act of encoding the transmit data comprises the further act of encoding the transmit data in the data burst in accordance with a first reduced-size data burst format defined by the second portion of the predefined data burst format and a second payload size that is less than the first payload size;
- reading additional transmit data from the transmit data queue and encoding the additional transmit data in a reduced-size data burst in accordance with a second reduced-size data burst format, the second reduced-size data burst format defined by the first portion of the predefined data burst format and the second payload size that is less than the first payload size;
- causing the encoded additional transmit data to be transmitted in the reduced-size data burst during a first portion of the time slot Y which consecutively follows the time slot X; and
- after causing the encoded additional transmit data to be transmitted, tuning the wireless transceiver during a second portion of the time slot Y for reception.

13. The method of claim 1, wherein a predefined data burst format of the wireless communication system is associated with a first time period of a given time slot in the wireless communication system, a first payload size, and representable by a first portion and a second portion, the first portion including a first encrypted bits field and the second portion including a second encrypted bits field, the method comprising the further acts of:
- wherein the act of encoding the transmit data comprises the further act of encoding the transmit data in the data burst in accordance with a first reduced-size data burst format defined by the second portion of the predefined data burst format;
- reading additional transmit data from the transmit data queue and encoding the additional transmit data in a reduced-size data burst in accordance with a second reduced-size data burst format, the second reduced-size data burst format defined by the first portion of the predefined data burst format;
- causing the encoded additional transmit data to be transmitted in the reduced-size data burst during a first portion of the time slot Y which consecutively follows the time slot X; and
- after causing the encoded additional transmit data to be transmitted, tuning the wireless transceiver during a second portion of the time slot Y for reception.

14. The method of claim 1, wherein the wireless communication system comprises a Global System for Mobile communications "GSM" system.

15. The method of claim 1, which is embodied in a computer program product comprising a computer readable medium and computer instructions stored in the computer readable medium.

16. The method of claim 1, wherein a plurality of receive time slots and a single transmit time slot for each data frame are assigned to the mobile station, the single transmit time slot comprising the time slot X.

17. A mobile station, comprising:
- one or more processors;
- a wireless transceiver coupled to the one or more processors;
- the wireless transceiver being operative in a wireless communication network, where data is communicated therebetween in a plurality of data bursts within time slots assigned to the mobile station, and where downlink time slots have time boundaries that are in time alignment with time boundaries of uplink time slots;
- the one or more processors being operative to:
  - receive, through the wireless transceiver, data in a time slot W;
  - tune the wireless transceiver, during a first portion of a time slot X which follows consecutively the time slot W, for transmission;
  - read transmit data from a transmit data queue and encode the transmit data in a data burst in accordance with a data burst format; and
  - cause the encoded transmit data to be transmitted via the wireless transceiver in the data burst during a second portion of the time slot X, up to or across a time boundary between the time slot X and a time slot Y which consecutively follows the time slot X.

18. The mobile station of claim 17, wherein a predefined data burst format of the wireless communication system has a length corresponding to a time duration of a given time slot in the wireless communication system, and the one or more processors are further operative to encode the transmit data by encoding the transmit data in the data burst in accordance with the predefined data burst format.

19. The mobile station of claim 17, wherein a predefined data burst format of the wireless communication system has a length corresponding to a time duration of a given time slot in the wireless communication system, the one or more processors being further operative to:
- encode the transmit data by encoding the transmit data in the data burst in accordance with the predefined data burst format; and
- cause the encoded transmit data to be transmitted in the data burst during a first portion of the time slot Y which consecutively follows the time slot X.

20. The mobile station of claim 17, wherein a predefined data burst format of the wireless communication system has a first length corresponding to a time duration of a given time slot in the wireless communication system and a first payload size, the one or more processors being further operative to:
- encode the transmit data by encoding the transmit data in the data burst in accordance with a reduced-size data burst format having a second length that is less than the first length and a second payload size that is less than the first payload size.

21. The mobile station of claim 17, wherein a predefined data burst format of the wireless communication system has a first length corresponding to a time duration of a given time slot in the wireless communication system and a first payload size, the one or more processors being further operative to:
- encode the transmit data by encoding the transmit data in the data burst in accordance with a reduced-size data burst format having a second length that is less than the first length and a second payload size that is less than the first payload size;
- read additional transmit data from the transmit data queue and encode the additional transmit data in a reduced-size data burst in accordance with the reduced-size data burst format; and
- cause the encoded additional transmit data to be transmitted in the reduced-size data burst during a first portion of the time slot Y which follows consecutively the time slot X.

22. The mobile station of claim 17, wherein a predefined data burst format of the wireless communication system has a first length corresponding to a time duration of a given time slot in the wireless communication system and a first payload size, the one or more processors being further operative to:
- encode the transmit data by encoding the transmit data in the data burst in accordance with a reduced-size data burst format having a second length that is less than the first length and a second payload size that is less than the first payload size;
- read additional transmit data from the transmit data queue and encode the additional transmit data in a reduced-size data burst in accordance with the reduced-size data burst format;
- read the encoded additional transmit data to be transmitted in the reduced-size data burst during a first portion of the time slot Y which follows consecutively the time slot X; and
- after causing the encoded additional transmit data to be transmitted, tune the wireless transceiver during a second portion of the time slot Y for reception.

23. The mobile station of claim 17, wherein a predefined data burst format of the wireless communication system is representable by a first portion and a second portion, the first portion including a first encrypted bits field and the second portion including a second encrypted bits field, the one or more processors being further operative to:
- encode the transmit data by encoding the transmit data in the data burst in accordance with a reduced-size data burst format defined by the second portion of the predefined data burst format without the first portion of the predefined data burst format.

24. The mobile station of claim 17, wherein a predefined data burst format of the wireless communication system has a length corresponding to a time duration of a given time slot in the wireless communication system and representable by a first portion and a second portion, the one or more processors being further operative to:
- encode the transmit data by encoding the transmit data in the data burst in accordance with a first reduced-size data burst format defined by the second portion of the predefined data burst format without the first portion of the predefined data burst format;
- read additional transmit data from the transmit data queue and encode the additional transmit data in a reduced-size data burst in accordance with a second reduced-size data burst format, the second reduced-size data burst format defined by the first portion of the predefined data burst format without the second portion of the predefined data burst format; and
- cause the encoded additional transmit data to be transmitted in the reduced-size data burst during a first portion of the time slot Y which consecutively follows the time slot X.

25. A communication system, comprising:
- a wireless communication network;
- a plurality of mobile stations operative in the wireless communication network for communications;
- the wireless communication network being operative to communicate data with a mobile station in a plurality of data bursts within time slots assigned to the mobile station, where downlink time slots have time boundaries that are in time alignment with time boundaries of uplink time slots;
- the mobile station being operative to:
  - receive, through a wireless transceiver, data in a time slot W;
  - tune the wireless transceiver, during a first portion of a time slot X which consecutively follows the time slot W, for transmission;
  - read transmit data from a transmit data queue and encode the transmit data in a data burst in accordance with a data burst format; and
  - cause the encoded transmit data to be transmitted via the wireless transceiver to the wireless communication network in the data burst during a second portion of the time slot X, up to or across a time boundary between the time slot X and a time slot Y which consecutively follows the time slot X.

26. The communication system of claim 25, wherein a predefined data burst format of the wireless communication system has a length corresponding to a time duration of a given time slot in the wireless communication system, and the mobile station is further operative to encode the transmit data by encoding the transmit data in the data burst in accordance with the predefined data burst format.

27. The communication system of claim 25, wherein a predefined data burst format of the wireless communication system has a length corresponding to a time duration of a given time slot in the wireless communication system, the mobile station being further operative to:
- encode the transmit data by encoding the transmit data in the data burst in accordance with the predefined data burst format; and
- cause the encoded transmit data to be transmitted in the data burst during a first portion of the time slot Y which consecutively follows the time slot X.

28. The communication system of claim 25, wherein a predefined data burst format of the wireless communication system has a first length corresponding to a time duration of a given time slot in the wireless communication system and a first payload size, the mobile station being further operative to:
- encode the transmit data by encoding the transmit data in the data burst in accordance with a reduced-size data burst format having a second length that is less than the first length and a second payload size that is less than the first payload size.

29. The communication system of claim 25, wherein a predefined data burst format of the wireless communication system has a first length corresponding to a time duration of a given time slot in the wireless communication system and a first payload size, the mobile station being further operative to:
- encode the transmit data by encoding the transmit data in the data burst in accordance with a reduced-size data burst format having a second length that is less than the first length and a second payload size that is less than the first payload size;
- read additional transmit data from the transmit data queue and encode the additional transmit data in a reduced-size data burst in accordance with the reduced-size data burst format; and
- cause the encoded additional transmit data to be transmitted in the reduced-size data burst during a first portion of the time slot Y which consecutively follows the time slot X.

30. The communication system of claim 25, wherein a predefined data burst format of the wireless communication system has a first length corresponding to a time duration of a given time slot in the wireless communication system and a first payload size, the mobile station being further operative to:
- encode the transmit data by encoding the transmit data in the data burst in accordance with a reduced-size data burst format having a second length that is less than the first length and a second payload size that is less than the first payload size;

read additional transmit data from the transmit data queue and encode the additional transmit data in a reduced-size data burst in accordance with the reduced-size data burst format;

read the encoded additional transmit data to be transmitted in the reduced-size data burst during a first portion of the time slot Y which follows consecutively the time slot X; and after causing the encoded additional transmit data to be transmitted, tune the wireless transceiver during a second portion of the time slot Y for reception.

31. The communication system of claim 25, wherein a predefined data burst format of the wireless communication system is representable by a first portion and a second portion, the first portion including a first encrypted bits field and the second portion including a second encrypted bits field, the mobile station being further operative to:

encode the transmit data by encoding the transmit data in the data burst in accordance with a reduced-size data burst format defined by the second portion of the predefined data burst format without the first portion of the predefined data burst format.

32. The communication system of claim 25, wherein a predefined data burst format of the wireless communication system has a length corresponding to a time duration of a given time slot in the wireless communication system and representable by a first portion and a second portion, the mobile station being further operative to:

encode the transmit data by encoding the transmit data in the data burst in accordance with a first reduced-size data burst format defined by the second portion of the predefined data burst format without the first portion of the predefined data burst format;

read additional transmit data from the transmit data queue and encode the additional transmit data in a reduced-size data burst in accordance with a second reduced-size data burst format, the second reduced-size data burst format defined by the first portion of the predefined data burst format without the second portion of the predefined data burst format; and cause the encoded additional transmit data to be transmitted in the reduced-size data burst during a first portion of the time slot Y which consecutively follows the time slot X.

33. A method for use in providing data communications in a wireless communication system, where data is communicated between a mobile station and a wireless communication network in a plurality of data bursts within time slots assigned to the mobile station, and where a given data burst is encoded in accordance with a predefined data burst format having a first length corresponding to a time duration of a given time slot and a first payload size, the method comprising the acts of:

receiving, through a wireless transceiver, data in a time slot W;

tuning the wireless transceiver, during a first portion of a time slot X which consecutively follows the time slot W, for transmission;

reading transmit data from a transmit data queue and encoding the transmit data in a reduced-sized data burst in accordance with a reduced-size data burst format having a second length that is less than the first length and a second payload size that is less than the first payload size; and causing the encoded transmit data to be transmitted in the reduced-sized data burst during a second portion of the time slot X.

34. The method of claim 33, comprising the further acts of:

reading additional transmit data from the transmit data queue and encoding the additional transmit data in the reduced-size data burst in accordance with the reduced-size data burst format; and causing the encoded additional transmit data to be transmitted in the reduced-size data burst during a first portion of the time slot Y which consecutively follows the time slot X.

35. The method of claim 33, comprising the further acts of:

reading additional transmit data from the transmit data queue and encoding the additional transmit data in the reduced-size data burst in accordance with the reduced-size data burst format;

causing the encoded additional transmit data to be transmitted in the reduced-size data burst during a first portion of the time slot Y which follows consecutively the time slot X; and after causing the encoded additional transmit data to be transmitted, tuning the wireless transceiver during second portion of the time slot Y for reception.

36. The method of claim 33, which is embodied in a computer program product comprising a computer readable medium and computer instructions stored in the computer readable medium.

37. A method for use in providing data communications in a wireless communication system, where data is communicated between a mobile station and a wireless communication network in a plurality of data bursts within time slots assigned to the mobile station, and where a given data burst is encoded in accordance with a predefined data burst format representable by a first portion and a second portion, the method comprising the acts of:

receiving, through a wireless transceiver, data in a time slot W;

tuning the wireless transceiver, during a first portion of a time slot X which consecutively follows the time slot W, for transmission;

reading transmit data from a transmit data queue and encoding the transmit data in a data burst in accordance with a reduced-size data burst format defined by the second portion of the predefined data burst format without the first portion of the predefined data burst format; and causing the encoded transmit data to be transmitted in the reduced-sized data burst during a second portion of the time slot X.

38. The method of claim 37, wherein the first portion includes a first encrypted bits field and the second portion including a second encrypted bits field.

39. The method of claim 37, wherein the predefined data burst format has a first length corresponding to a time duration of a given time slot in the wireless communication system and a first payload size, and wherein the reduced-size data burst format has a second length that is less than the first length and a second payload size that is less than the first payload size.

40. The method of claim 37, wherein the reduced-sized data burst comprises a first reduced-sized data burst and the reduced-sized data burst format comprises a first reduced-size data burst format, the method comprising the further acts of:

reading additional transmit data from the transmit data queue and encoding the additional transmit data in a second reduced-size data burst in accordance with a second reduced-size data burst format, the second reduced-size data burst format defined by the first portion of the predefined data burst format without the second portion of the predefined data burst format; and causing the encoded additional transmit data to be transmitted in the reduced-size data burst during a first portion of the time slot Y which consecutively follows the time slot X.

41. The method of claim 37, wherein the first portion includes a first encrypted bits field and the second portion includes a second encrypted bits field, and wherein the reduced-sized data burst comprises a first reduced-sized data burst and the reduced-sized data burst format comprises a first reduced-size data burst format, the first reduced-size data burst format defined by the method comprising the further acts of:

reading additional transmit data from the transmit data queue and encoding the additional transmit data in a second reduced-size data burst in accordance with a second reduced-size data burst format, the second reduced-size data burst format defined by the second encrypted bits field without the first encrypted bits field;

causing the encoded additional transmit data to be transmitted in the first reduced-size data burst during a first portion of the time slot Y which consecutively follows the time slot X; and after causing the encoded additional transmit data to be transmitted, tuning the wireless transceiver during a second portion of the time slot Y for reception.

42. The method of claim 37, which is embodied in a computer program product comprising a computer readable medium and computer instructions stored in the computer readable medium.

* * * * *